(12) United States Patent
Endo et al.

(10) Patent No.: US 9,570,924 B2
(45) Date of Patent: Feb. 14, 2017

(54) BATTERY PACK

(71) Applicant: MAKITA CORPORATION, Anjo-shi, Aichi (JP)

(72) Inventors: Takayoshi Endo, Anjo (JP); Shunpei Yamaji, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 249 days.

(21) Appl. No.: 14/590,395

(22) Filed: Jan. 6, 2015

(65) Prior Publication Data

US 2015/0200553 A1 Jul. 16, 2015

(30) Foreign Application Priority Data

Jan. 15, 2014 (JP) ................................ 2014-005295
Oct. 1, 2014 (JP) ................................ 2014-203269

(51) Int. Cl.
*H02J 7/00* (2006.01)
*H01M 2/10* (2006.01)
(Continued)

(52) U.S. Cl.
CPC .......... *H02J 7/0031* (2013.01); *H01M 2/1072* (2013.01); *H01M 2/348* (2013.01);
(Continued)

(58) Field of Classification Search
CPC ................ H02J 7/0031; H02J 2007/004; H02J 2007/0037; H02J 7/0047; H02J 7/0063; H02J 7/0065; H02J 2007/0067; Y02E 60/12; H01M 10/48; H01M 10/44; G01R 31/3648; G01R 31/3651; G01R 31/3624
(Continued)

(56) References Cited

U.S. PATENT DOCUMENTS 6,268,713 B1 7/2001 Thandiwe
7,436,151 B2 10/2008 Wang et al.
(Continued)

FOREIGN PATENT DOCUMENTS

CN 1790857 A 6/2006
CN 101790829 A 7/2010
(Continued)

OTHER PUBLICATIONS

Jul. 20, 2016 Office Action issued in Chinese Patent Application No. 201510017709.7.
(Continued)

*Primary Examiner* — Richard Isla Rodas
*Assistant Examiner* — Mohammed J Sharief
(74) *Attorney, Agent, or Firm* — Oliff PLC

(57) ABSTRACT

A battery pack of one aspect of an embodiment of the present disclosure comprises a battery, a control unit, a pair of external terminals, a first current cut-off unit, and a second current cut-off unit. The control unit determines whether the first current cut-off unit and the second current cut-off unit are normal or abnormal when neither charge nor discharge of the battery is performed. When the first current cut-off unit and the second current cut-off unit are both normal, the control unit turns the first current cut-off unit and the second current cut-off unit to an energized state. When at least one of the first current cut-off unit and the second current cut-off unit is abnormal, the control unit turns the first current cut-off unit or the second current cut-off unit to a cut-off state.

12 Claims, 12 Drawing Sheets

(51) Int. Cl.
 *H01M 2/34* (2006.01)
 *H01M 10/42* (2006.01)
(52) U.S. Cl.
 CPC .... *H01M 10/42* (2013.01); *H01M 2010/4271* (2013.01); *H01M 2200/103* (2013.01); *H02J 7/0021* (2013.01); *H02J 7/0026* (2013.01)
(58) Field of Classification Search
 USPC ................................ 320/132, 134, 135, 136
 See application file for complete search history.

(56) References Cited

U.S. PATENT DOCUMENTS

| | | | |
|---|---|---|---|
| 2006/0139006 A1* | 6/2006 | Wang | H02J 7/0031 320/134 |
| 2006/0139008 A1 | 6/2006 | Park | |
| 2009/0085519 A1* | 4/2009 | Kim | H02J 7/0011 320/134 |
| 2009/0184685 A1 | 7/2009 | Sim et al. | |
| 2011/0109275 A1 | 5/2011 | Taniguchi | |
| 2011/0205672 A1 | 8/2011 | Sakai | |
| 2012/0161681 A1 | 6/2012 | Kuroda | |
| 2012/0212159 A1 | 8/2012 | Kitamoto | |
| 2013/0229186 A1 | 9/2013 | Shiraishi et al. | |

FOREIGN PATENT DOCUMENTS

| | | |
|---|---|---|
| CN | 102273044 A | 12/2011 |
| CN | 103296715 A | 9/2013 |
| EP | 2328268 A1 | 6/2011 |
| JP | 5281843 B2 | 9/2013 |
| WO | 00/51219 A1 | 8/2000 |

OTHER PUBLICATIONS

Mar. 26, 2015 Extended European Search Report issued in European Application No. 15 15 0947.8.

Aug. 31, 2016 Office Action issued in European Patent Application No. 15 150 947.8.

* cited by examiner

BATTERY PACK

CROSS-REFERENCE TO RELATED APPLICATIONS

This application claims the benefit of Japanese Patent Application No. 2014-005295 filed Jan. 15, 2014 in the Japan Patent Office and Japanese Patent Application No. 2014-203269 filed Oct. 1, 2014 in the Japan Patent Office, the disclosures of which are incorporated herein by reference.

BACKGROUND

The present disclosure relates to a battery pack that includes a battery having at least one rechargeable battery and that performs charge from a charger to the battery and power supply (discharge) from the battery to a motor-driven appliance.

As disclosed in Published Japanese Patent No. 5281843, for example, a battery pack that is attached to a motor-driven appliance, such as a power tool and a motor-driven operating machine, and that supplies power thereto includes a battery having at least one rechargeable battery; a control circuit that monitors a battery voltage, a current flowing to the battery during charge to the battery, and a current flowing from the battery during discharge of the battery, to thereby control charge and discharge of the battery; and a pair of external terminals for electrical connection to an external device (charger or motor-driven appliance).

The battery pack may further include a protection element that inhibits a current from flowing through a current path connecting the battery and the external terminals, when an abnormality occurs in the battery pack.

If a current flows through the current path connecting the battery and the external terminals when the battery pack is abnormal, the protection element cuts off the electrical connection between the battery and the external terminals, and thereby protects the battery and the external device (charger or motor-driven appliance) from being damaged. The protection element may comprise, for example, a fuse, an SCP (self-control protector), or an FET.

SUMMARY

In the above-described battery pack, when the protection element is abnormal (in failure), the electrical connection between the battery and the external terminals cannot be cut off appropriately, and thus, the battery and the external device (charger or motor-driven appliance) may not be protected.

In the battery pack including the SCP as a protection element, for example, in a case where a heater for melt-cutting the fuse in the SCP is in an open failure state (disconnection failure state), the fuse in the SCP cannot be melt-cut, and the electrical connection between the battery and the external terminals cannot be cut off appropriately. As a result, the battery and the external device (charger or motor-driven appliance) may not be protected.

Alternatively, in the battery pack including the FET as a protection element, in a case where a short circuit occurs in the FET, the FET cannot be turned OFF (to an open state), and the electrical connection between the battery and the external terminals cannot be cut off appropriately. As a result, the battery and the external device (charger or motor-driven appliance) may not be protected.

In one aspect of an embodiment of the present disclosure, it is preferred that, in a battery pack including a protection element, a current can be inhibited from flowing when the battery pack is abnormal, even in a case where the protection element is abnormal.

A battery pack of one aspect of an embodiment of the present disclosure comprises a battery, a control unit, a pair of external terminals, a first current cut-off unit, and a second current cut-off unit.

The battery comprises at least one rechargeable battery. The control unit is configured to monitor a state of the battery and to control at least one of charge and discharge of the battery. The pair of external terminals is configured for an electrical connection of an external device.

The first current cut-off unit is provided in a power supply path that is formed by connecting the battery and the pair of external terminals and through which flows at least one of a charge current and a discharge current. The first current cut-off unit is configured to be turned to one of an energized state and a cut-off state based on a command from the control unit, to thereby turn the power supply path to one of an energized state and a cut-off state. The second current cut-off unit is connected in series to the first current cut-off unit in the power supply path. The second current cut-off unit is configured to be turned to one of an energized state and a cut-off state based on a command from the control unit, to thereby turn the power supply path to one of an energized state and a cut-off state.

The control unit determines whether the first current cut-off unit and the second current cut-off unit are normal or abnormal when neither charge nor discharge of the battery is performed. Thus, in the battery pack, states of the first current cut-off unit and the second current cut-off unit can be determined with harmful effects inhibited from being exerted on charge operation or discharge operation of the battery.

When the first current cut-off unit and the second current cut-off unit are both normal, the control unit turns the first current cut-off unit and the second current cut-off unit to an energized state. Thus, while enabling charge operation and discharge operation of the battery in the battery pack, protective operation (cut-off of the electrical connection between the battery and the external terminal) by the first current cut-off unit and the second current cut-off unit can be performed when the battery pack is abnormal.

When at least one of the first current cut-off unit and the second current cut-off unit is abnormal, the control unit turns the at least one of the first current cut-off unit and the second current cut-off unit to a cut-off state. Thus, the electrical connection between the battery and the external terminal can be cut off appropriately, to thereby inhibit a current from flowing when the battery pack is abnormal.

Consequently, according to the battery pack of the present aspect, even when at least one of the first current cut-off unit and the second current cut-off unit serving as protective elements is abnormal, it is possible to inhibit a current from flowing when the battery pack is abnormal.

Next, in the above-described battery pack, the control unit may determine whether at least one of the first current cut-off unit and the second current cut-off unit is normal or abnormal after the battery pack is disconnected from the external device.

For a while shortly after the battery pack is disconnected from the external device, the battery pack is not connected to an external device (charger, motor-driven appliance, or the like) and neither charge nor discharge of the battery is performed. Thus, it is an appropriate timing for checking whether at least one of the first current cut-off unit and the second current cut-off unit is normal or abnormal.

Next, in the above-described battery pack, the pair of external terminals may comprise a first external terminal and a second external terminal, the battery may comprise a positive electrode and a negative electrode, the first current cut-off unit may be provided in a path extending from the negative electrode of the battery to the first external terminal in the power supply path, and the second current cut-off unit may be provided in a path extending from the positive electrode of the battery to the second external terminal in the power supply path.

The control unit may turn the first current cut-off unit to a cut-off state and turn the second current cut-off unit to an energized state when determining whether the first current cut-off unit is normal or abnormal, and under such conditions, the control unit may determine whether the first current cut-off unit is normal or abnormal based on a potential in a first power supply path extending from the first current cut-off unit to the first external terminal.

Specifically, under the conditions in which the first current cut-off unit is turned to a cut-off state and the second current cut-off unit is turned to an energized state, the potential in the first power supply path is a value independent of a potential in the negative electrode of the battery if the first current cut-off unit is normal. However, if the first current cut-off unit is abnormal (short-circuit abnormality state, especially), the potential in the first power supply path is approximately the same as that in the negative electrode of the battery.

Thus, it is possible to determine whether the first current cut-off unit is normal or abnormal based on the potential in the first power supply path under the conditions in which the first current cut-off unit is turned to a cut-off state and the second current cut-off unit is turned to an energized state.

Next, in the case where the first current cut-off unit is provided in the path extending from the negative electrode of the battery to the first external terminal and the second current cut-off unit is provided in the path extending from the positive electrode of the battery to the second external terminal, the above-described battery pack may comprise a state determination circuit arranged so as to connect the first power supply path extending from the first current cut-off unit to the first external terminal and a second power supply path extending from the second current cut-off unit to the second external terminal to each other.

The state determination circuit comprises a diode that allows a current to flow in a direction of discharge of the battery, a resistive element connected in series to an anode of the diode, and a zener diode, a cathode and an anode of which are respectively connected to the anode of the diode and to a ground potential, which is a potential in the negative electrode of the battery.

A potential at an interconnection point between the cathode of the zener diode and the anode of the diode in the state determination circuit can be used to determine whether at least one of the first current cut-off unit and the second current cut-off unit is normal or abnormal because the potential varies according to the potential in the first power supply path or a potential in the second power supply path.

For example, when a state (normal or abnormal) of the first current cut-off unit is to be determined, if the first current cut-off unit is normal under the conditions in which the first current cut-off unit is turned to a cut-off state and the second current cut-off unit is turned to an energized state, a current flows from the second power supply path to a ground via the resistive element and the zener diode, and thus, the potential at the interconnection point between the cathode of the zener diode and the anode of the diode is a potential corresponding to a breakdown voltage of the zener diode. In contrast, if the first current cut-off unit is abnormal (short-circuit abnormality state, especially) under the conditions in which the first current cut-off unit is turned to a cut-off state and the second current cut-off unit is turned to an energized state, a current flows from the second power supply path to the battery via the resistive element, the diode, and the first current cut-off unit, and thus, the potential at the interconnection point between the cathode of the zener diode and the anode of the diode is a potential corresponding to a forward voltage of the diode.

Alternatively, for example, when a state (normal or abnormal) of the second current cut-off unit is to be determined, if the second current cut-off unit is normal under the conditions in which the second current cut-off unit is turned to a cut-off state and the first current cut-off unit is also turned to a cut-off state, no or substantially no current flows through the state determination circuit, and thus, the potential at the interconnection point between the cathode of the zener diode and the anode of the diode is a low potential corresponding to a potential of the ground to which the interconnection point is connected via the zener diode. In contrast, if the second current cut-off unit is abnormal (short-circuit state, especially) under the conditions in which the second current cut-off unit is turned to a cut-off state and the first current cut-off unit is also turned to a cut-off state, a current flows from the second power supply path to the ground via the resistive element and the zener diode, and thus, the potential at the interconnection point between the cathode of the zener diode and the anode of the diode is a potential corresponding to the breakdown voltage of the zener diode.

Thus, the control unit can determine whether at least one of the first current cut-off unit and the second current cut-off unit is normal or abnormal based on the potential at the interconnection point between the cathode of the zener diode and the anode of the diode in the state determination circuit.

That is, in the battery pack of the present aspect, the state determination circuit makes it possible to determine whether at least one of the first current cut-off unit and the second current cut-off unit is normal or abnormal.

It is to be noted that the potential in the first power supply path includes a potential in the first current cut-off unit and that the potential in the second power supply path includes a potential in the second current cut-off unit.

Next, in the case where the first current cut-off unit is provided in the path extending from the negative electrode of the battery to the first external terminal and the second current cut-off unit is provided in the path extending from the positive electrode of the battery to the second external terminal, the above-described battery pack may comprise a second state determination circuit arranged so as to be connected to the first power supply path extending from the first current cut-off unit to the first external terminal, to the second power supply path extending from the second current cut-off unit to the second external terminal, and to a voltage output terminal that outputs a specified drive voltage.

The second state determination circuit comprises a determination resistor unit including a pair of terminals, a determination diode including an anode and a cathode, and a switching unit including a pair of terminals, A first terminal in the pair of terminals of the determination resistor unit is connected to the voltage output terminal, and a second terminal in the pair of terminals of the determination resistor unit is connected to the anode of the determination diode.

A first terminal in the pair of terminals of the switching unit is connected to the cathode of the determination diode, and a second terminal in the pair of terminals of the switching unit is connected to the first power supply path. The switching unit is configured to electrically connect the cathode of the determination diode and the first power supply path to each other when a potential difference is generated between the first power supply path and the second power supply path, and is configured to electrically cut off the cathode of the determination diode and the first power supply path from each other when no or substantially no potential difference is generated between the first power supply path and the second power supply path. It is to be noted that "substantially no potential difference is generated" may mean that the potential difference is equal to or smaller than a specified threshold.

A potential at an interconnection point between the second terminal in the pair of terminals of the determination resistor unit and the anode of the determination diode in the second state determination circuit can be used to determine whether at least one of the first current cut-off unit and the second current cut-off unit is normal or abnormal because the potential varies depending on whether a potential difference is generated between the first power supply path and the second power supply path.

For example, when a state (normal or abnormal) of the first current cut-off unit is to be determined, if the first current cut-off unit and the second current cut-off unit are both normal under the conditions in which the first current cut-off unit is turned to a cut-off state and the second current cut-off unit is turned to an energized state, no or substantially no potential difference is generated between the first power supply path and the second power supply path. As a result, the switching unit electrically cuts off the cathode of the determination diode and the first power supply path from each other, and thus, a current running from the voltage output terminal toward the negative electrode of the battery via the determination resistor unit, the determination diode, the switching unit, the first power supply path, and the first current cut-off unit does not flow. At such a time, the potential at the interconnection point between the second terminal in the pair of terminals of the determination resistor unit and the anode of the determination diode is a potential corresponding to a drive voltage outputted from the voltage output terminal.

In contrast, when a state (normal or abnormal) of the first current cut-off unit is to be determined, if the first current cut-off unit is abnormal (short-circuit abnormality state, especially) and the second current cut-off unit is normal under the conditions in which the first current cut-off unit is turned to a cut-off state and the second current cut-off unit is turned to an energized state, a potential difference is generated between the first power supply path and the second power supply path. As a result, the switching unit electrically connects the cathode of the determination diode and the first power supply path to each other, and thus, the current running from the voltage output terminal toward the negative electrode of the battery via the determination resistor unit, the determination diode, the switching unit, the first power supply path, and the first current cut-off unit does flow. At such a time, the potential at the interconnection point between the second terminal in the pair of terminals of the determination resistor unit and the anode of the determination diode is a potential corresponding to a voltage drop in the determination diode, the switching unit, the first power supply path, and the first current cut-off unit.

Consequently, it is possible to determine a state (normal or abnormal) of the first current cut-off unit by measuring the potential at the interconnection point between the second terminal in the pair of terminals and the anode of the determination diode in the determination resistor unit under the conditions in which the first current cut-off unit is turned to an energized state and the second current cut-off unit is also turned to an energized state, and by using the measured potential.

On the other hand, when a state (normal or abnormal) of the second current cut-off unit is to be determined, if the first current cut-off unit and the second current cut-off unit are both normal under the conditions in which the first current cut-off unit is turned to an energized state and the second current cut-off unit is also turned to an energized state, a potential difference is generated between the first power supply path and the second power supply path. As a result, the switching unit electrically connects the cathode of the determination diode and the first power supply path to each other, and thus, the current running from the voltage output terminal toward the negative electrode of the battery via the determination resistor unit, the determination diode, the switching unit, the first power supply path, and the first current cut-off unit does flow. At such a time, the potential at the interconnection point between the second terminal in the pair of terminals of the determination resistor unit and the anode of the determination diode is a potential corresponding to the voltage drop in the determination diode, the switching unit, the first power supply path, and the first current cut-off unit.

In contrast, when a state (normal or abnormal) of the second current cut-off unit is to be determined, if the first current cut-off unit is normal and the second current cut-off unit is abnormal (disconnection abnormality state, especially) under the conditions in which the first current cut-off unit is turned to an energized state and the second current cut-off unit is also turned to an energized state, no potential difference is generated between the first power supply path and the second power supply path. As a result, the switching unit electrically cuts off the cathode of the determination diode and the first power supply path from each other, and thus, the current running from the voltage output terminal toward the negative electrode of the battery via the determination resistor unit, the determination diode, the switching unit, the first power supply path, and the first current cut-off unit does not flow. At such a time, the potential at the interconnection point between the second terminal in the pair of terminals of the determination resistor unit and the anode of the determination diode is a potential corresponding to the drive voltage outputted from the voltage output terminal.

Consequently, it is possible to determine a state (normal or abnormal) of the second current cut-off unit by measuring the potential at the interconnection point between the second terminal in the pair of terminals of the determination resistor unit and the anode of the determination diode under the conditions in which the first current cut-off unit is turned to an energized state and the second current cut-off unit is also turned to an energized state, and by using the measured potential.

Therefore, the control unit can determine whether the first current cut-off unit and the second current cut-off unit are normal or abnormal based on the potential at the interconnection point between the second terminal in the pair of terminals of the determination resistor unit and the anode of the determination diode in the second state determination circuit.

That is, in the battery pack of the present aspect, the second state determination circuit makes it possible to determine whether at least one of the first current cut-off unit and the second current cut-off unit is normal or abnormal.

It is to be noted that the potential in the first power supply path includes a potential in the first current cut-off unit and that the potential in the second power supply path includes a potential in the second current cut-off unit.

Next, in the above-described battery pack, the first current cut-off unit may comprise a switching element that is connected in series to the power supply path and is capable of being selectively turned ON and OFF, and the second current cut-off unit may comprise at least one protection circuit including a fuse connected in series to the power supply path and a heating element that melt-cuts the fuse.

The control unit may energize the heating element in the second current cut-off unit to melt-cut the fuse when the first current cut-off unit is determined to be abnormal, to thereby cut off the power supply path.

In this way, by energizing the heating element in the second current cut-off unit to melt-cut the fuse, it is possible to reliably inhibit a current from flowing through the power supply path when the battery pack is abnormal, even in the case where the first current cut-off unit is abnormal.

Next, in the above-described battery pack, in the case where the second current cut-off unit comprises the protection circuit, the control unit may determine whether the second current cut-off unit is normal or abnormal based on a potential in the heating element in the second current cut-off unit.

Specifically, when the second current cut-off unit including the protection circuit is normal, the potential in the heating element is approximately the same as that in the positive electrode of the battery. However, when the second current cut-off unit including the protection circuit is abnormal (disconnection abnormality state, especially), the potential in the heating element is independent of the potential in the positive electrode of the battery.

Thus, the second current cut-off unit including the protection circuit can be determined to be normal or abnormal based on the potential in the heating element.

Next, in the above-described battery pack, in the case where the second current cut-off unit comprises the at least one protection circuit, the at least one protection circuit may comprise a plurality of protection circuits connected in parallel to each other.

In the battery pack, each of the plurality of protection circuits may comprise an energization control unit that is connected to the heating element and allows a current for melt-cutting the fuse to flow through the heating element. The control unit may determine whether the second current cut-off unit is normal or abnormal based on a potential in the heating element in one of the plurality of protection circuits.

By using the second current cut-off unit including the plurality of protection circuits connected in parallel to each other, energization via the second current cut-off unit can be performed even in a case where a charge current or a discharge current is a large current.

In addition, the plurality of protection circuits can be normally operated owing to the existence of the energization control unit connected to the heating element in each of the plurality of protection circuits.

Furthermore, the energization control unit connected to the heating element is provided in each of the plurality of protection circuits, to thereby make it possible to inhibit an unexpectedly large current from flowing serially through the plurality of heating elements and to normally operate each of the plurality of protection circuits.

Next, in the above-described battery pack, in the case where the first current cut-off unit is provided in the path extending from the negative electrode of the battery to the first external terminal and the second current cut-off unit is provided in the path extending from the positive electrode of the battery to the second external terminal, the first current cut-off unit may comprise a switching element that is connected in series to the power supply path and is capable of being selectively turned ON and OFF, and the second current cut-off unit may comprise a switching element that is connected in series to the power supply path and is capable of being selectively turned ON and OFF.

The control unit may turn the first current cut-off unit and the second current cut-off unit both to a cut-off state when determining whether the second current cut-off unit is normal or abnormal, and may determine whether the second current cut-off unit is normal or abnormal based on a potential in the second power supply path extending from the second current cut-off unit to the second external terminal.

Specifically, under the condition in which the first current cut-off unit and the second current cut-off unit are both turned to a cut-off state, if the second current cut-off unit is normal, the potential in the second power supply path is a value independent of the potential in the positive electrode of the battery. However, if the second current cut-off unit is abnormal (short-circuit abnormality state, specifically), the potential in the second power supply path is approximately the same as that in the positive electrode of the battery.

Thus, it is possible to determine whether the second current cut-off unit is normal or abnormal based on the potential in the second power supply path under the conditions in which the first current cut-off unit and the second current cut-off unit are both turned to a cut-off state.

Next, the above-described battery pack may comprise a storage unit that stores information that the battery pack is in a prohibited state, in which at least one of charge and discharge is prohibited, when at least one of the first current cut-off unit and the second current cut-off unit is determined to be abnormal.

Due to such a configuration, when an external device (charger, motor-driven appliance, or the like) is connected to the battery pack, the control unit can determine whether the battery pack is in a prohibited state based on the information stored in the storage unit. If the battery pack is in a prohibited state, charge and discharge thereof can be prohibited by means of software.

According to the thus-configured battery pack, reliability in terms of safety is improved because charge and discharge thereof can be prohibited by means of both software and hardware.

Next, the above-described battery pack including the storage unit may comprise a permanent failure determination unit configured to turn at least one of the first current cut-off unit and the second current cut-off unit to an unenergizable state in a case where an energization in the power supply path is detected when the information that the battery pack is in the prohibited state is stored in the storage unit.

The situation in which the prohibited state of the battery pack is stored in the storage unit is a situation in which at least one of the first current cut-off unit and the second current cut-off unit is determined to be abnormal, and the reason why a current is flowing through the power supply path under such a situation is considered to be that some abnormality occurs in the battery pack and the battery is discharging.

Thus, in the case where the permanent failure determination unit has detected an energization in the power supply path when the prohibited state of the battery pack is stored in the storage unit, the permanent failure determination unit turns at least one of the first current cut-off unit and the second current cut-off unit to an unenergizable state to thereby forcibly stop a current from flowing through the power supply path and stop abnormal discharge of the battery.

According to the thus-configured battery pack, it is possible to stop abnormal discharge of the battery, and to inhibit an accident due to such abnormal discharge of the battery from occurring.

Next, in the above-described battery pack, a part of the power supply path may be configured to allow the charge current and the discharge current both to flow therethrough, and the second current cut-off unit may be provided in the part of the power supply path.

By providing the second current cut-off unit in the part of the power supply path through which both the charge current and the discharge current flow, each of the charge current and the discharge current can be inhibited from flowing when the battery pack is abnormal, which is not the case where only any one of the charge current and the discharge current can be inhibited from flowing when the battery pack is abnormal. In addition, when it is detected in the battery that the charger fails to properly detect a fully-charged state and is overcharging, the second current cut-off unit is cut off to thereby enable inhibition of overcharge.

BRIEF DESCRIPTION OF THE DRAWINGS

Exemplary embodiments will be described below by way of example with reference to the accompanying drawings, in which.

DETAILED DESCRIPTION OF THE PREFERRED EMBODIMENTS

[Configuration of Entire Power Tool]

Figure 1:
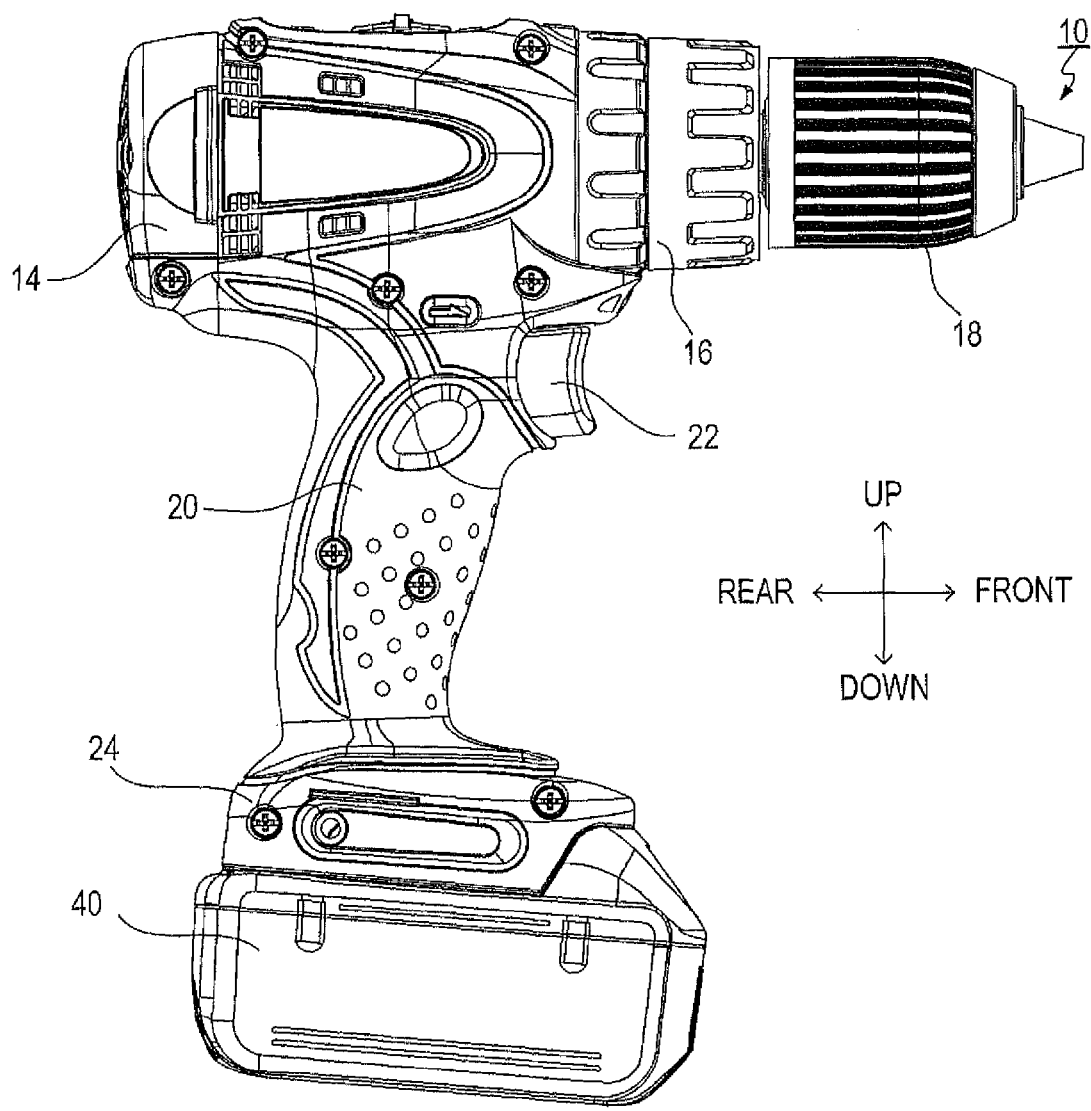
FIG. 1 is a side view showing a configuration of an entire power tool of an embodiment.

As shown in FIG. 1, a power tool of the present embodiment includes a power tool body 10 configured as a so-called driver drill, and a battery pack 40 that is detachably attached to the power tool body 10 and supplies power thereto.

The power tool body 10 includes a motor housing 14, a gear housing 16 located in front of the motor housing 14, a drill chuck 18 located in front of the gear housing 16, and a handgrip 20 located below the motor housing 14.

The motor housing 14 contains a motor 30 (see FIG. 3) that generates a driving force to rotationally drive the drill chuck 18.

The gear housing 16 contains a gear mechanism (not shown) that transmits the driving force of the motor 30 to the drill chuck 18.

The drill chuck 18 includes an attachment mechanism (not shown) for detachable attachment of a tool bit (not shown) to a front end of the drill chuck 18.

The handgrip 20 is configured to be graspable in one hand by a user of the power tool. Provided to the handgrip 20 at an upper front portion thereof is a trigger switch 22 for driving and stopping the motor 30 by the user of the power tool.

Further provided to the handgrip 20 at a lower end thereof is a battery pack attachment portion 24 for detachable attachment of the battery pack 40. The battery pack attachment portion 24 is configured such that the battery pack 40 can be detached therefrom when the user of the power tool slides the battery pack 40 toward a front of the power tool body 10.

Figure 2:
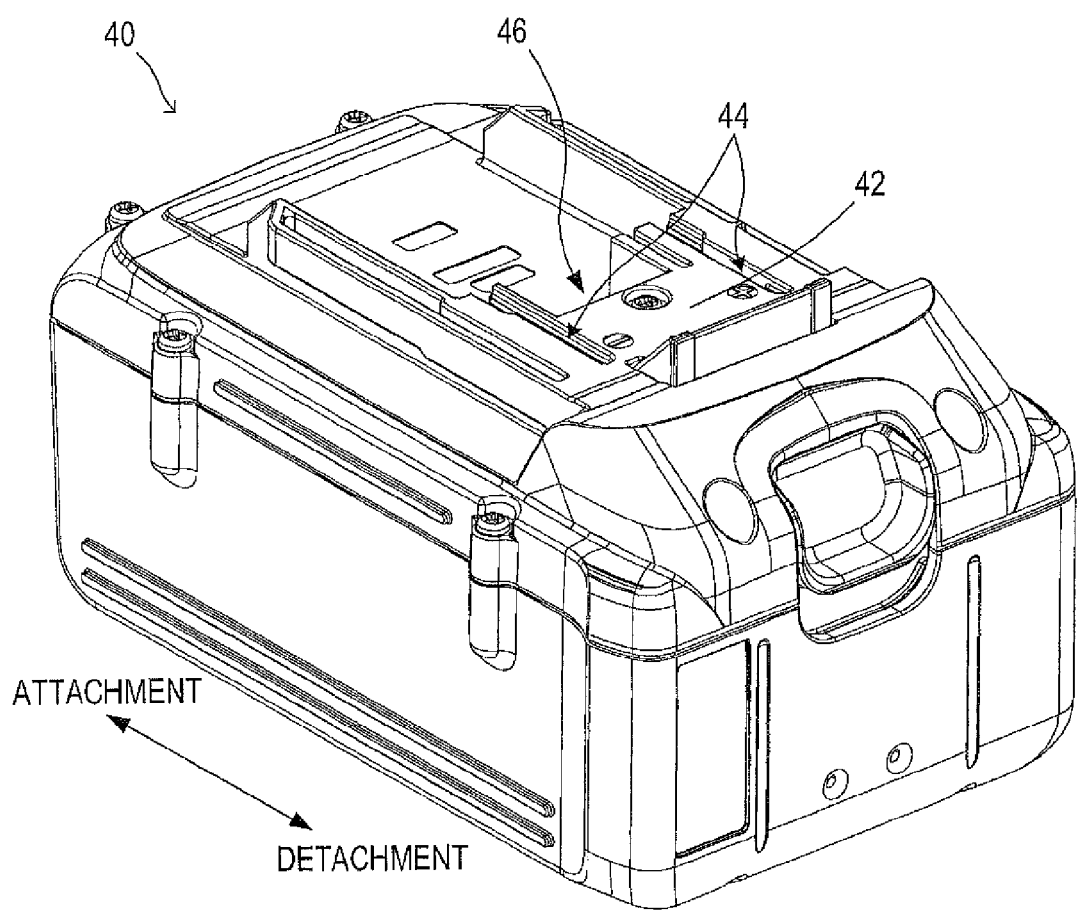
FIG. 2 is a perspective view showing an appearance of a battery pack to be attached to a power tool body.
Figure 4:
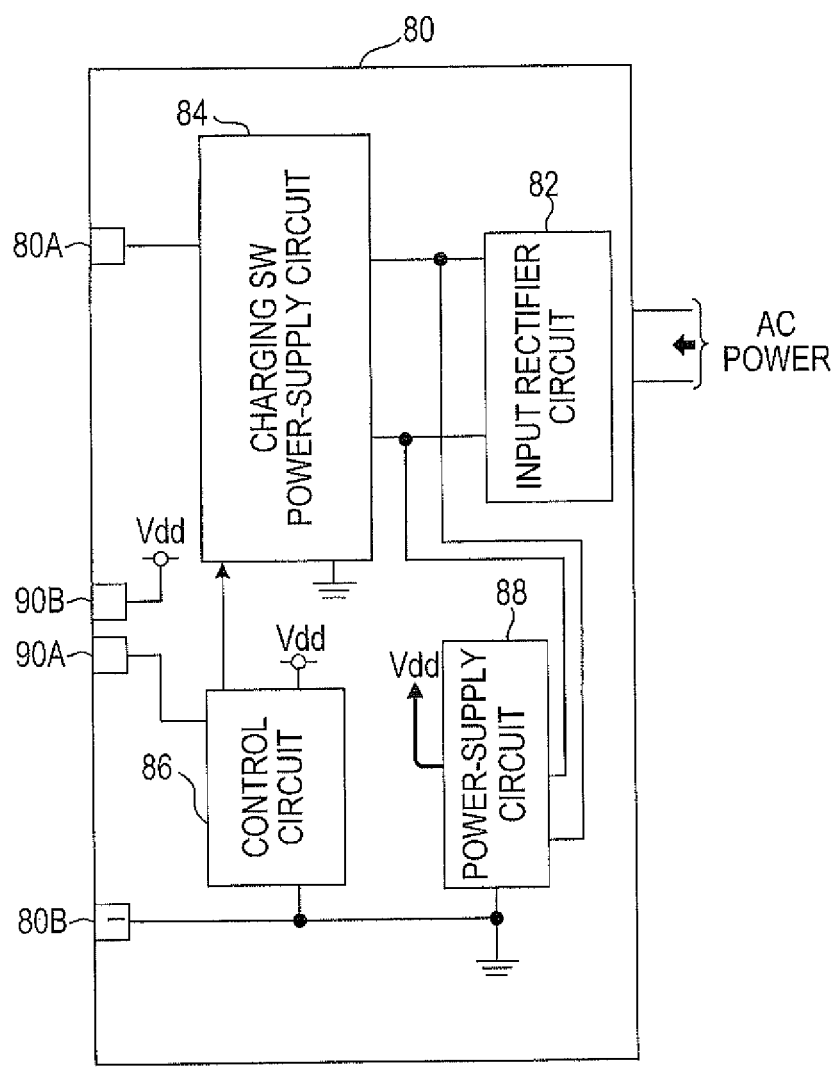
FIG. 4 is a block diagram showing a configuration of a charger used to charge the battery pack.

Specifically, as shown in FIG. 2, there is provided, on a top of the battery pack 40, a connector portion 42 for connection to the battery pack attachment portion 24 of the power tool body 10 or to a charger 80 (see FIG. 4). The connector portion 42 includes a power-supply terminal portion 44 and a connection terminal portion 46 for electrical connection to the power tool body 10 or the charger 80.

Figure 3:
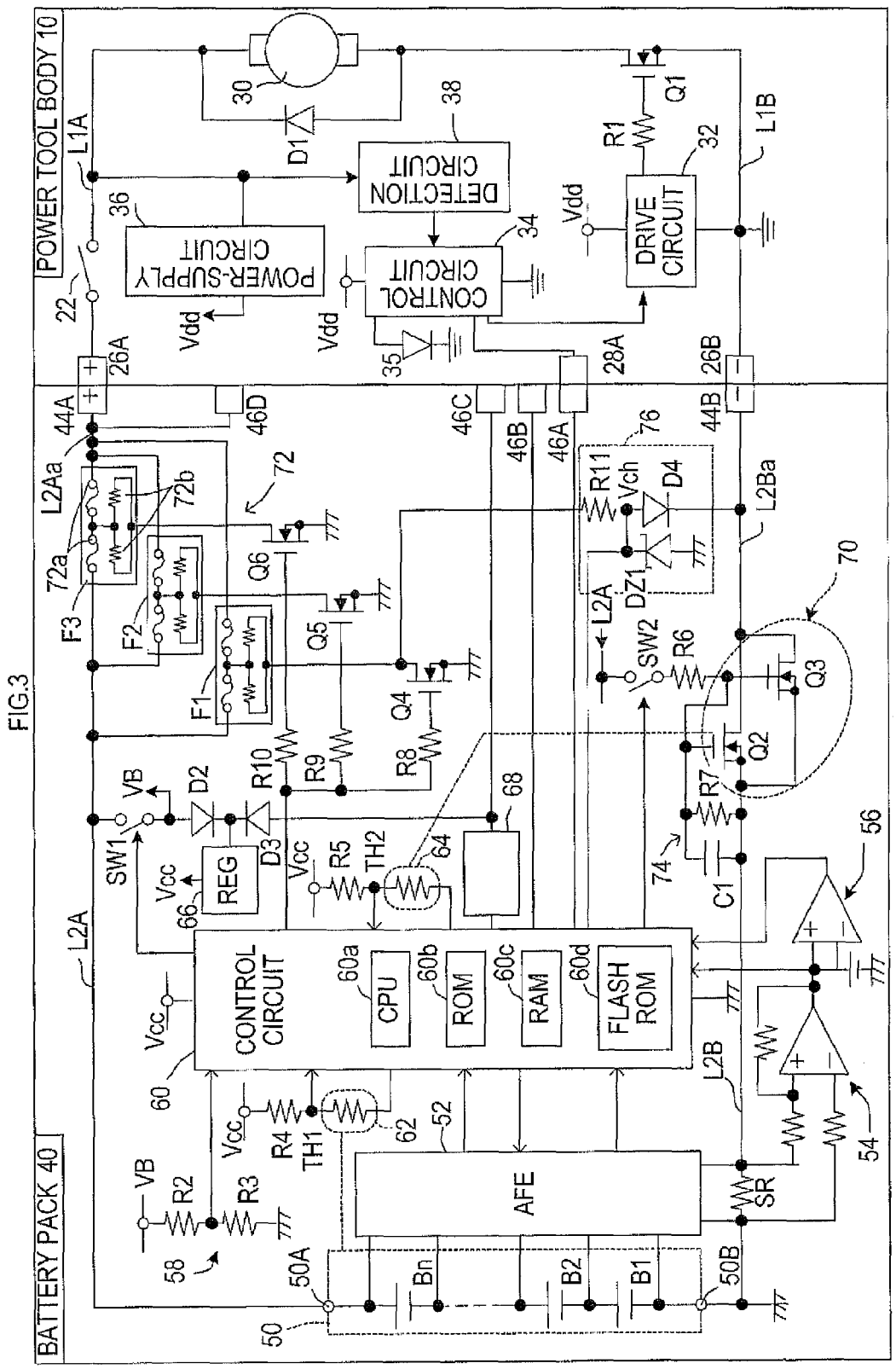
FIG. 3 is a block diagram showing a circuit configuration of the entire power tool including the battery pack.

The battery pack 40 is configured such that a case (see FIG. 2) having the connector portion 42 contains a battery 50 capable of charging and discharging via the connector portion 42 (see FIG. 3).

When the battery pack 40 is attached to the power tool body 10 via the connector portion 42, the battery pack 40 is electrically connected to internal circuits in the power tool body 10 via the power-supply terminal portion 44 and the connection terminal portion 46 provided to the connector portion 42, to thereby enable the power tool body 10 to be supplied with DC power (see FIG. 3).

Similarly, when the battery pack 40 is attached to the charger 80 (see FIG. 4) via the connector portion 42, the battery pack 40 is electrically connected to a charging circuit in the charger 80 via the power-supply terminal portion 44 and the connection terminal portion 46, to thereby enable the charger 80 to charge the battery 50.

[Circuit Configuration of Power Tool Body]

As shown in FIG. 3, the power tool body 10 includes a positive terminal 26A and a negative terminal 26B as terminals for connection to the power-supply terminal portion 44 of the battery pack 40, and also includes a connection terminal 28A as a terminal for connection to the connection terminal portion 46.

The positive terminal 26A is connected to one end of the motor 30 via the trigger switch 22 and a positive power-supply line L1A. The negative terminal 26B is connected to the other end of the motor 30 via a switching element Q1 for controlling energization of the motor 30 and a negative power-supply line L1B.

In the present embodiment, the motor 30 comprises a brushed DC motor, for example. When the trigger switch 22 is ON, the switching element Q1 is turned ON via a drive circuit 32, and the motor 30 is thereby energized and rotated.

Connected to the motor 30 is a diode (so-called flywheel diode) D1 that guides a high voltage generated in the negative power-supply line L1B when the switching element Q1 is turned OFF to the positive power-supply line L1A. The switching element Q1 comprises an n-channel MOS-FET, to a gate of which a drive signal is inputted from the drive circuit 32 via a resistor R1.

The power tool body 10 further includes a control circuit 34 that controls ON/OFF of the switching element Q1 via the drive circuit 32 in accordance with a command from the battery pack 40. The control circuit 34 of the present embodiment includes a microcomputer having a CPU, a ROM, and a RAM.

Also provided to the power tool body 10 are a power-supply circuit 36 that receives power from the battery pack 40 and supplies power to the control circuit 34 and to the drive circuit 32 when the trigger switch 22 is ON, and a detection circuit 38 that detects an operation amount of the trigger switch 22.

When the control circuit 34 receives power (a power-supply voltage Vdd) from the power-supply circuit 36 and is activated, the control circuit 34 communicates with a control circuit 60 in the battery pack 40 to be described later, to thereby notify that the battery pack 40 is attached to the power tool body 10.

The control circuit 34 outputs a control signal to the drive circuit 32 according to the operation amount of the trigger switch 22 detected by the detection circuit 38, and thereby controls a rotational speed of the motor 30.

An LED 35 is connected to the control circuit 34, and the control circuit 34 causes the LED 35 to light up during operation of the motor 30 to indicate that the motor 30 is in operation to the user.

[Circuit Configuration of Battery Pack]

Next, the battery pack 40 includes a positive terminal 44A and a negative terminal 44B provided to the power-supply terminal portion 44, connection terminals 46A-46D provided to the connection terminal portion 46, the battery 50, an AFE (analog front end) 52 for detecting a battery state, and the control circuit 60.

Connected to the positive terminal 44A via a positive power-supply line L2A is a positive terminal 50A of the battery 50. Connected to the negative terminal 44B via a negative power-supply line L2B is a negative terminal 50B of the battery 50. The negative terminal 50B of the battery 50 is connected to a ground line in the battery pack 40. In the positive power-supply line L2A, a path extending from a cut-off switch 72 to the positive terminal 44A of the power-supply terminal portion 44 is defined as a path L2Aa. In the negative power-supply line L2B, a path extending from a cut-off switch 70 to the negative terminal 44B of the power-supply terminal portion 44 is defined as a path L2Ba. The path L2Aa includes the cut-off switch 72 and the positive terminal 44A of the power-supply terminal portion 44. The path L2Ba includes the cut-off switch 70 and the negative terminal 44B of the power-supply terminal portion 44.

When the battery pack 40 is attached to the power tool body 10, the positive terminal 44A is connected to the positive terminal 26A of the power tool body 10, the negative terminal 44B is connected to the negative terminal 26B of the power tool body 10, and a connection terminal 46A is connected to the connection terminal 28A of the power tool body 10.

The control circuit 60 of the present embodiment includes a microcomputer having a CPU 60a, a ROM 60b, and a RAM 60c, similarly to the control circuit 34 in the power tool body 10. In the present embodiment, the control circuit 60 further includes a flash ROM 60d, which is a non-volatile memory.

When the battery pack 40 is attached to the power tool body 10, the control circuit 60 is connected to the control circuit 34 in the power tool body 10 via the connection terminals 46A and 28A, and a two-way communication between the control circuit 60 and the control circuit 34 is thereby enabled.

The connection terminals 46B-46D are to be connected to a connection terminal portion of the charger 80 when the battery pack 40 is attached to the charger 80, but are open when the battery pack 40 is attached to the power tool body 10.

The connection terminal 46D is connected to the positive power-supply line L2A similarly to the positive terminal 44A, and, when the battery pack 40 is attached to the charger 80, the connection terminal 46D forms an energization path together with the negative terminal 44B, the negative power-supply line L2B, and so on. In this way, the connection terminal 46D takes in a charge voltage from the charger 80 and supplies a charge current to the battery 50.

The battery 50 comprises a plurality of battery cells B1, B2, . . . , Bn connected in series between the positive terminal 50A and the negative terminal 50B, and generates a drive voltage (DC 36 V, for example) for driving the motor 30.

The battery cells B1, B2, . . . , Bn comprise lithium-ion batteries each generating a DC voltage of 3.6 V, for example.

The AFE 52 is an analog circuit configured to detect values of cell voltages of the battery cells B1, B2, . . . , Bn forming the battery 50 in accordance with a command from the control circuit 60, and configured to detect a value of a charge current to the battery 50 and a value of a discharge current from the battery 50 via a current detection resistor SR provided to the negative power-supply line L2B. The values of the cell voltages, the value of the charge current, and the value of the discharge current detected by the AFE 52 are inputted into the control circuit 60.

Connected to the current detection resistor SR is a discharge current detection circuit 54 that detects the value of the discharge current. Connected to the discharge current detection circuit 54 is an overload determination circuit 56 that determines whether the value of the discharge current has reached a specified overload determination threshold. A result detected by the discharge current detection circuit 54 and a result determined by the overload determination circuit 56 are also inputted into the control circuit 60.

The discharge current detection circuit 54 is designed to detect the value of the discharge current from a potential difference between both ends of the current detection resistor SR, and comprises a differential amplifier circuit including an operational amplifier. The overload determination circuit 56 comprises a comparator that compares an output voltage from the discharge current detection circuit 54 with a reference voltage serving as the overload determination threshold.

The battery pack 40 further includes a battery voltage detection circuit 58 that detects a battery voltage VB, a thermistor 62 that detects a cell temperature TH1 of the battery 50, and a thermistor 64 that detects a substrate temperature TH2 of a substrate on which the above-described respective circuits and power-supply lines are provided. The battery voltage VB, the cell temperature TH1, and the substrate temperature TH2 detected by such respective portions are also inputted into the control circuit 60.

The battery voltage detection circuit 58 is configured to divide the battery voltage VB between both ends of the battery 50 with resistors R2 and R3, and is configured to input the divided voltage into the control circuit 60. The thermistors 62 and 64, which are temperature detection elements, divide a power-supply voltage Vcc generated by a regulator 66 in the battery pack 40 with resistors R4 and R5, respectively, and input the divided voltages into the control circuit 60 as detected results of the cell temperature TH1 and the substrate temperature TH2, respectively.

The regulator 66 is designed to receive a power supply from the positive power-supply line L2A or the charger 80 to be described later, and is designed to generate the power-supply voltage (DC constant voltage) Vcc for driving internal circuits.

Specifically, respective cathodes of diodes D2 and D3 are connected to an input side of the regulator 66, whereas an anode of the diode D2 is connected to the positive power-supply line L2A in the battery pack 40 via a shutdown switch SW1, and an anode of the diode D3 is connected to the connection terminal 46C for taking in a charger-side power-supply voltage Vdd from the charger 80 to be described later.

The shutdown switch SW1 is designed to be turned OFF in accordance with a shutdown signal outputted from the control circuit 60, and is maintained ON as long as the battery 50 is normal.

Specifically, when discharge of the battery 50 proceeds as a result of a situation in which, for example, the battery pack 40 is left unattended for a long period of time and a significant reduction in the battery voltage VB is thereby caused, the control circuit 60 outputs a shutdown signal to turn OFF the shutdown switch SW1 in order to inhibit overdischarge of the battery 50.

Thus, in a normal state in which the shutdown switch SW1 is ON, a larger voltage from among the battery voltage VB supplied from the battery 50 via the positive power-supply line L2A and the power-supply voltage Vdd supplied from the charger 80 is inputted into the regulator 66.

In contrast, when the shutdown switch SW1 is OFF, if the battery pack 40 is not attached to the charger 80, the regulator 66 cannot generate the power-supply voltage Vcc, and thus, the control circuit 60 stops operation.

However, in such a state, when the battery pack 40 is attached to the charger 80 and the power-supply voltage Vdd is supplied from the charger 80 via the connection terminal 46C, the regulator 66 generates the power-supply voltage Vcc for driving the internal circuits in the battery pack 40 with the power-supply voltage Vdd.

As a result, the control circuit 60 is activated, and charging from the charger 80 to the battery 50 is started under control by the control circuit 60.

Next, the battery pack 40 further includes a charger detection circuit 68 that detects that the battery pack 40 is attached to the charger 80 from the power-supply voltage Vdd inputted via the connection terminal 46C, the cut-off switch 70 that cuts off the negative power-supply line L2B, and the cut-off switch 72 that cuts off the positive power-supply line L2A.

Here, the cut-off switch 70 comprises a pair of switching elements Q2 and Q3 connected in parallel to each other with the drains thereof connected to each other and with the sources thereof connected to each other. The cut-off switch 70 is provided in the negative power-supply line L2B with the drains thereof arranged at a side near to the negative terminal 44B of the battery pack 40 and with the sources thereof arranged at a side near to the negative terminal 50B of the battery 50.

The switching elements Q2 and Q3 each comprise an n-channel MOSFET, and are configured to be capable of being concurrently turned ON or OFF by a bias circuit 74 in common provided between the positive power-supply line L2A and the negative power-supply line L2B.

Specifically, the bias circuit 74 comprises a series circuit including a control switch SW2, which is turned ON/OFF in accordance with a signal from the control circuit 60, a resistor R6, and a resistor R7. An end of the series circuit at a side near to the control switch SW2 is connected to the positive power-supply line L2A, and an end at a side near to the resistor R7 is connected to the negative power-supply line L2B.

Interconnection points between the resistor R6 and the resistor R7 are each connected to each gate of the switching elements Q2 and Q3, and a capacitor C1 to stabilize a gate voltage is also connected in parallel to the resistor R7.

Thus, in a state where the control switch SW2 is ON, when a specified bias voltage is applied to the gates of the switching elements Q2 and Q3 to turn the switching elements Q2 and Q3 ON, the negative power-supply line L2B becomes a conductive state, and a charge current or a discharge current flows to or from the battery 50.

At such a time, the charge current and the discharge current are each divided and flow through the two switching elements Q2 and Q3, and thus, the switching elements Q2 and Q3 each having a smaller allowable current can be used compared with a case where a single FET is used as a switching element. To put it another way, it becomes possible to flow a larger current by using the switching elements Q2 and Q3 each having a larger allowable current.

When the control switch SW2 is turned OFF and the bias voltage is no longer applied to the gates of the switching elements Q2 and Q3, the switching elements Q2 and Q3 are both turned OFF to thereby cut off the negative power-supply line L2B.

The thermistor 64, which detects the substrate temperature TH2, is arranged in the vicinity of the switching elements Q2 and Q3 forming the cut-off switch 70.

This is because, when a discharge current flowing from the battery 50 to the power tool body 10 via the cut-off switch 70 becomes large (when the battery 50 is in an overload state, in other words), the temperature of the cut-off switch 70 becomes high.

That is, in the present embodiment, the control circuit 60 is designed to determine whether the battery 50 is in an overload state based on the substrate temperature TH2 detected via the thermistor 64.

On the other hand, the cut-off switch 72 comprises three protection circuits F1-F3 each including a fuse portion 72a provided in the positive power-supply line L2A and a heater portion (heating resistor, specifically) 72b that generates heat by energization thereof to melt-cut the fuse portion 72a.

The protection circuits F1-F3 are connected in parallel to each other in order to each divide a charge current and a discharge current to/from the battery 50 to reduce each current flowing through the respective fuse portion 72*a*. This makes it possible to use the protection circuits F1-F3 each having a smaller allowable current compared with a case where the cut-off switch 72 comprises a single protection circuit. To put it another way, it becomes possible to flow a larger current by using the protection circuits F1-F3 each having a larger allowable current.

In each of the protection circuits F1-F3, one end of the heater portion 72*b* is connected to the positive power-supply line L2A via the fuse portion 72*a*, and the other end of the heater portion 72*b* is connected to a ground line via switching elements Q4-Q6, respectively.

Similarly to the above-described switching elements Q1-Q3, the switching elements Q4-Q6 each comprise an n-channel MOSFET. In the switching elements Q4-Q6, each drain is connected to the heater portion 72*b* of the protection circuits F1-F3, respectively, and each source is connected to the ground line. Each gate of the switching elements Q4-Q6 is connected to one output port of the control circuit 60 via resistors R8-R10, respectively.

Thus, when a high-level drive signal is inputted from the output port of the control circuit 60 into each of the gates of the switching elements Q4-Q6 via the resistors R8-R10, respectively, and the respective switching elements Q4-Q6 are turned ON, in each of the protection circuits F1-F3, the heater portion 72*b* generates heat to melt-cut the fuse portion 72*a*.

When the fuse portion 72*a* is melt-cut, the positive power-supply line L2A is cut off. Since the fuse portion 72*a* can no longer become conductive, after the control circuit 60 has caused the positive power-supply line L2A to be cut off via the respective protection circuits F1-F3, such a state is maintained to thereby make the battery pack 40 unusable.

An interconnection point between the heater portion 72*b* of the protection circuit F1 and a drain of the switching element Q4 is connected to the negative power-supply line L2B via a state determination circuit 76. The state determination circuit 76 includes a resistor R11, a diode D4, and a zener diode DZ1. One end of the resistor R11 is connected to the drain of the switching element Q4, and the other end of the resistor R11 is connected to an anode of the diode D4. The anode of the diode D4 is connected to the resistor R11, and a cathode of the diode D4 is connected to the negative power-supply line L2B. Connected to an interconnection point between the resistor R11 and the diode D4 is a cathode of the zener diode DZ1, and an anode of the zener diode DZ1 is connected to a ground line.

The state determination circuit 76 (the resistor R11, the diode D4, and the zener diode DZ1) is provided in order to determine states (normal or abnormal) of the cut-off switches 70 and 72 when the battery pack 40 is not connected to the power tool body 10 or the charger 80. Specifically, the state determination circuit 76 is used to check whether the cut-off switch 70 is not in a short-circuit failure state and whether the cut-off switch 72 is not in a disconnection failure state.

Specifically, when the cut-off switch 70 is turned OFF in the state where the battery pack 40 is not connected to the power tool body 10 or the charger 80, a high voltage that is higher than a breakdown voltage is applied to the zener diode DZ1 via the resistor R11 if the cut-off switch 70 is normal, and a very small current flows through the zener diode DZ1.

Thus, a potential Vch at an interconnection point between the resistor R11 and the zener diode DZ1 in the state determination circuit 76 is a high potential corresponding to the breakdown voltage of the zener diode DZ1.

In contrast, when the cut-off switch 70 is in a short-circuit failure state, a forward current flows through the diode D4 via the resistor R11, and thus, the potential Vch at an interconnection point between the resistor R11 and the diode D4 in the state determination circuit 76 (the interconnection point between the resistor R11 and the zener diode DZ1, in other words) is a low potential corresponding to a forward voltage (0.6-0.7 V) of the diode D4.

When the cut-off switch 70 is turned OFF in the state where the battery pack 40 is not connected to the power tool body 10 or the charger 80, if the cut-off switch 72 (the protection circuit F1, specifically) is normal (i.e., if the fuse portion 72*a* is not melt-cut and the heater portion 72*b* is normally connected), a high voltage higher than the breakdown voltage is applied to the zener diode DZ1 via the resistor R11, and a very small current flows through the zener diode DZ1. As a result, the potential Vch is a high potential corresponding to the breakdown voltage of the zener diode DZ1.

In contrast, if the cut-off switch 72 is in a disconnection failure state (i.e., if the fuse portion 72*a* is melt-cut), the cut-off switch 72 (the protection circuit F1, specifically) and the state determination circuit 76 are electrically insulated from each other, and no current flows through the state determination circuit 76. At such a time, the potential Vch is a low potential corresponding to a potential of the ground to which the interconnection point is connected via the zener diode DZ1.

In short, when the cut-off switches 70 and 72 are both normal, the potential Vch is a high potential, and when the cut-off switch 70 is abnormal (short-circuit abnormality state) or the cut-off switch 72 is abnormal (disconnection abnormality state), the potential Vch is a low potential.

Thus, when the battery pack 40 is not connected to the power tool body 10 or the charger 80, the control circuit 60 temporarily turns the control switch SW2 (and thus, the cut-off switch 70) OFF, and takes in a cathode-side potential (the potential Vch) of the zener diode DZ1 in the state determination circuit 76 to thereby perform a failure determination (state determination) of the cut-off switches 70 and 72.

Details of a cut-off unit state determination process for determining states of the cut-off switches 70 and 72 will be described later.

When the thus-configured battery pack 40 is attached to the power tool body 10 and the trigger switch 22 is operated, a power supply path from the battery 50 to the motor 30 is formed, and a current thereby flows through the motor 30 to rotate the motor 30.

When a discharge current flows from the battery pack 40 to the power tool body 10 to drive the motor 30, the control circuit 60 performs an abnormality determination process, to thereby monitor a cell voltage detected by the AFE 52, the discharge current detected by the discharge current detection circuit 54, and the cell temperature TH1 and the substrate temperature TH2 respectively detected by the thermistors 62 and 64.

The control circuit 60 determines whether the battery 50 is overloaded or overdischarged based on the monitored results, and when it is determined that the battery 50 is overloaded or overdischarged, the control circuit 60 outputs a command to stop the motor 30 to the control circuit 34 in the power tool body 10, to thereby turn the switching element Q1 OFF.

When the switching element Q1 is turned OFF as above, the control circuit 60 determines whether discharge from the battery 50 is stopped, and if the discharge from the battery 50 is not stopped, the control circuit 60 turns the cut-off switch 70 OFF.

Since the cut-off switch 70 is switchable between ON and OFF, the control circuit 60 turns the cut-off switch 70 OFF temporarily, and thereafter, when there is no need to protect the battery 50 from overload or overdischarge, the control circuit 60 performs a cut-off state release process that turns the cut-off switch 70 back ON.

When the cut-off switch 70 is turned OFF as above, the control circuit 60 determines again whether discharge from the battery 50 is stopped, and if the discharge from the battery 50 is not stopped, the control circuit 60 turns the cut-off switch 72 OFF to stop the discharge from the battery 50.

[Circuit Configuration of Charger]

Next, as shown in FIG. 4, the charger 80 includes an input rectifier circuit 82 that rectifies an external power-supply (AC 100 V power source, in this example) to a DC, a charging switching power-supply circuit 84 that generates a charging power for battery charging from a DC power-supply rectified by the input rectifier circuit 82, a control circuit 86 that controls generation of the charging power by the charging switching power-supply circuit 84 (and thus, controls charging to the battery 50), and a power-supply circuit 88 that generates a power-supply voltage (DC constant voltage) Vdd for activating the control circuit 86 from the DC power-supply rectified by the input rectifier circuit 82.

The control circuit 86 of the present embodiment includes a microcomputer having a CPU, a ROM, and a RAM, similarly to the control circuits 34 and 60 in the power tool body 10 and the battery pack 40, respectively. When the battery pack 40 is attached to the charger 80, the control circuit 86 is connected to the control circuit 60 in the battery pack 40 via a connection terminal 90A of the charger 80 and the connection terminal 46B of the battery pack 40, and a two-way communication between the control circuit 86 and the control circuit 60 is thereby enabled.

Further provided to the charger 80 is a connection terminal 90B for applying the power-supply voltage Vdd generated by the power-supply circuit 88 via the connection terminal 46C of the battery pack 40 when the battery pack 40 is attached to the charger 80.

Still further provided to the charger 80 are a positive charging terminal 80A and a negative charging terminal 80B. When the battery pack 40 is attached to the charger 80, the positive charging terminal 80A is connected to the connection terminal 46D of the battery pack 40, and the negative charging terminal 80B is connected to the negative terminal 44B of the battery pack 40.

The positive charging terminal 80A is connected to a line for output of a charge voltage from the charging switching power-supply circuit 84, and is used to apply the charge voltage to the positive terminal 50A of the battery 50 via the connection terminal 46D of the battery pack 40. The negative charging terminal 80B is connected to a ground line in common to the charging switching power-supply circuit 84.

In this way, the charging power generated by the charging switching power-supply circuit 84 is supplied to the battery 50 in the battery pack 40 via the positive charging terminal 80A and the negative charging terminal 80B.

The control circuit 86 monitors a state of charging to the battery 50 based on the communication with the control circuit 60 in the battery pack 40, while controlling the charging power from the charging switching power-supply circuit 84 until the battery 50 becomes a fully-charged state.

[Cut-Off Unit State Determination Process Performed in Battery Pack]

Next, an explanation will be given of the cut-off unit state determination process performed by the control circuit 60 in the battery pack 40.

The cut-off unit state determination process is a process for determining states (normal or abnormal) of the cut-off switches 70 and 72, and is performed when the charger detection circuit 68 determines that the battery pack 40 is connected to the charger 80. As for the cut-off switch 70, whether it is in a short-circuit abnormality state is determined, and as for the cut-off switch 72, whether it is in a disconnection abnormality state is determined.

Figure 5:
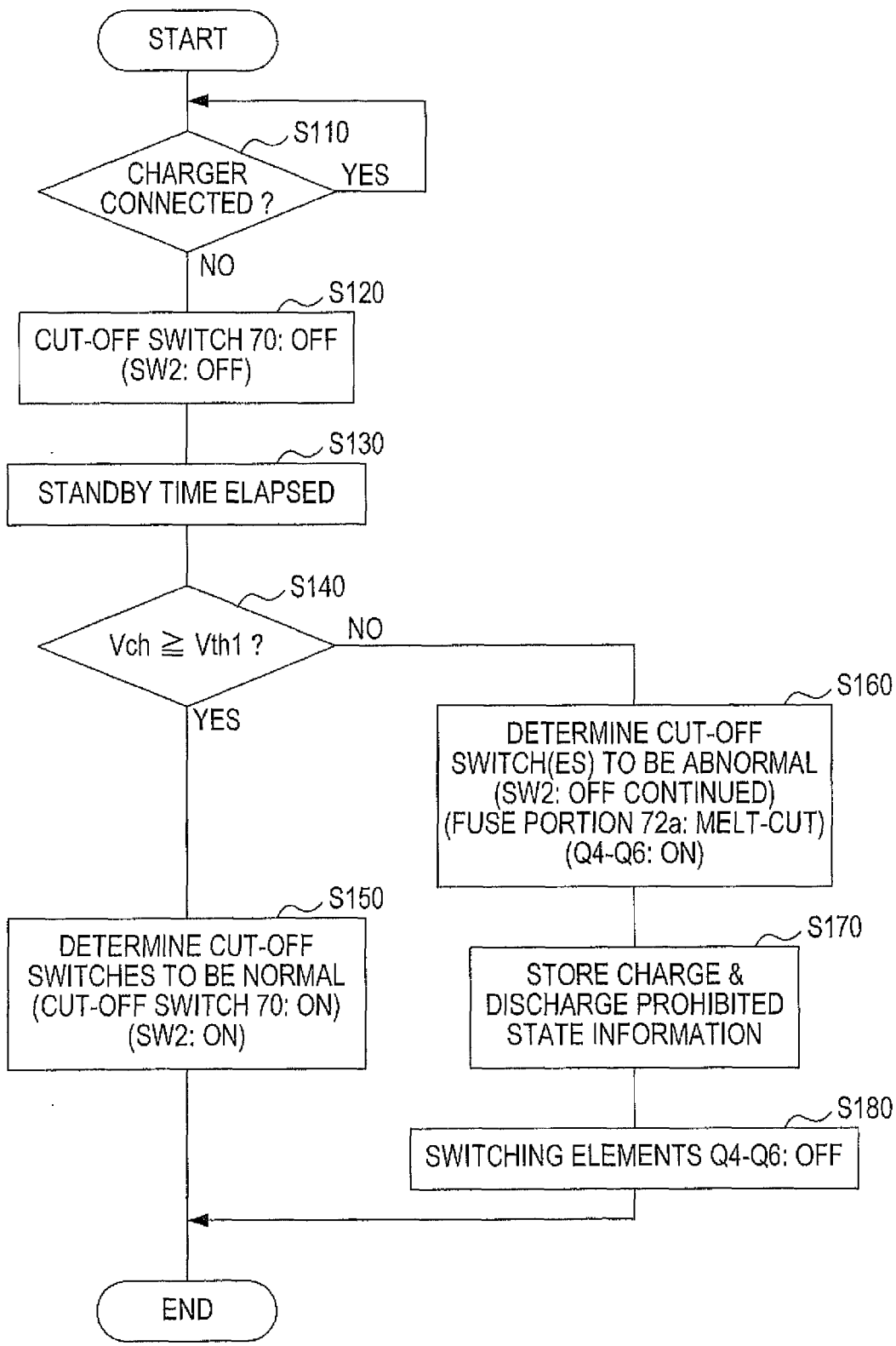
FIG. 5 is a flowchart showing a cut-off unit state determination process performed by a control circuit in the battery pack.

The cut-off unit state determination process is performed in accordance with a flowchart shown in FIG. 5.

When the cut-off unit state determination process is activated, first in S110 (S stands for step), it is determined whether the charger 80 is in a connection state. If an affirmative determination is made, S110 is performed repeatedly, and if a negative determination is made, the process proceeds to S120.

In S120, the cut-off switch 70 (the pair of switching elements Q2 and Q3) is turned OFF. Specifically, the control switch SW2 is turned OFF. Because of this, the bias voltage is no longer applied to the gates of the switching elements Q2 and Q3, to thereby turn the switching elements Q2 and Q3 both OFF. Then, the negative power-supply line L2B becomes a cut-off state, and the negative terminal 50B of the battery 50 and the negative terminal 44B of the power-supply terminal portion 44 are electrically cut off from each other.

Next, in S130, a standby state continues until elapse of a specified standby time (100 [msec], in the present embodiment).

Next, in S140, it is determined whether the potential Vch at the interconnection point between the resistor R11 and the zener diode DZ1 in the state determination circuit 76 is equal to or greater than a specified determination reference value Vth1 (1.5 [V], in the present embodiment). If an affirmative determination is made, the process proceeds to S150, and if a negative determination is made, the process proceeds to S160.

As described above, when the cut-off switch 70 (the switching elements Q2 and Q3) and the cut-off switch 72 (the protection circuit F1, specifically) are both normal, the potential Vch is a high potential corresponding to the breakdown voltage (2.0 [V], in the present embodiment) of the zener diode DZ1. In contrast, as described above, when the cut-off switch 70 (the switching elements Q2 and Q3) is abnormal (short-circuit abnormality state) or when the cut-off switch 72 (the protection circuit F1, specifically) is abnormal (disconnection abnormality state), the potential Vch is a low potential corresponding to the forward voltage (0.6-0.7 V) of the diode D4 or a ground potential.

Thus, as the determination reference value Vth1, a boundary value between the breakdown voltage (2.0 [V], in the present embodiment) of the zener diode DZ1 and the forward voltage (0.6-0.7 V) of the diode D4 is set.

If an affirmative determination is made in S140, the process proceeds to S150. In S150, it is determined that the cut-off switch 70 (the switching elements Q2 and Q3) and the cut-off switch 72 (the protection circuit F1, specifically) are both normal, and the cut-off switch 70 (the switching elements Q2 and Q3) is turned ON. Specifically, the control switch SW2 is turned ON. This causes a specified bias voltage to be applied to the gates of the switching elements Q2 and Q3 to turn the switching elements Q2 and Q3 ON. As a result, the negative power-supply line L2B becomes a conductive state, and the negative terminal 50B of the battery 50 and the negative terminal 44B of the power-supply terminal portion 44 are electrically connected to each other.

If a negative determination is made in S140, the process proceeds to S160. In S160, it is determined that at least one of the cut-off switch 70 (the switching elements Q2 and Q3) and the cut-off switch 72 (the protection circuit F1, specifically) is abnormal, and the control switch SW2 is maintained OFF, while the fuse portion 72a in each of the protection circuits F1-F3 in the cut-off switch 72 is melt-cut. Specifically, the fuse portion 72a is melt-cut by the heat generated in the heater portion 72b in each of the protection circuits F1-F3 by turning the switching elements Q4-Q6 ON, respectively.

In this way, at least one of the positive power-supply line L2A and the negative power-supply line L2B becomes a cut-off state, and an electrical connection between the battery 50 and the power-supply terminal portion 44 can be cut off appropriately.

For example, as for the positive power-supply line L2A, the protection circuits F1-F3 are all turned OFF to thereby turn the cut-off switch 72 OFF, and thus, the positive power-supply line L2A becomes a cut-off state, and the positive terminal 50A of the battery 50 and the positive terminal 44A of the power-supply terminal portion 44 are electrically cut off from each other. As for the negative power-supply line L2B, the control switch SW2 is turned OFF and the cut-off switch 70 is thereby turned OFF, and thus, the negative power-supply line L2B becomes a cut-off state, and the negative terminal 50B of the battery 50 and the negative terminal 44B of the power-supply terminal portion 44 are electrically cut off from each other.

As a result, the electrical connection between the battery 50 and the power-supply terminal portion 44 can be cut off appropriately, and in a case where the power tool body 10 is connected to the battery pack 40 when the battery pack 40 is abnormal, a current can be inhibited from flowing. That is, even when at least one of the cut-off switch 70 (the switching elements Q2 and Q3) and the cut-off switch 72 is abnormal, it is possible to inhibit a current from flowing when the battery pack 40 is abnormal.

Next, in S170, information that the battery pack 40 is in a state in which charge and discharge thereof are prohibited (prohibited state) is stored in the flash ROM 60d in the control circuit 60. In this way, it becomes possible to inform the power tool body 10 or the charger 80 that the battery pack 40 is in a "prohibited state" when the power tool body 10 or the charger 80 is connected to the battery pack 40.

Next, in S180, the respective switching elements Q4-Q6 are turned OFF.

When the process in S150 or S180 is complete, the cut-off unit state determination process ends.

[Effects]

As described above, the battery pack 40 of the present embodiment includes the cut-off switch 70 provided in the negative power-supply line L2B extending from the negative terminal 50B of the battery 50 to the negative terminal 44B of the power-supply terminal portion 44, and the cut-off switch 72 provided in the positive power-supply line L2A extending from the positive terminal 50A of the battery 50 to the positive terminal 44A of the power-supply terminal portion 44.

In the cut-off unit state determination process performed by the control circuit 60, after the battery pack 40 is detached from the charger 80 (affirmative determination in S110), the steps (S120-S140) of determining whether the cut-off switches 70 and 72 are normal or abnormal are performed. That is, the control circuit 60 determines whether the cut-off switches 70 and 72 are normal or abnormal when neither charge nor discharge of the battery 50 is performed.

Thus, in the battery pack 40, states of the cut-off switches 70 and 72 can be determined with no harmful effects caused on charge operation or discharge operation of the battery 50.

Then, when the control circuit 60 determines that the cut-off switches 70 and 72 are normal (affirmative determination in S140), the control circuit 60 turns the cut-off switch 70 to an energized state (S150). In this way, while enabling charge operation and discharge operation of the battery 50 in the battery pack 40, protective operation (cut-off of electrical connection between the battery 50 and the power-supply terminal portion 44) by the cut-off switches 70 and 72 can be performed when the battery pack 40 is abnormal (e.g., when overcurrent is detected by the overload determination circuit 56, the thermistor 62, the thermistor 64, or the like).

In contrast, when at least one of the cut-off switches 70 and 72 is abnormal, the control circuit 60 turns the cut-off switch 70 or 72 to a cut-off state (OFF). In this way, electrical connection between the battery 50 and the power-supply terminal portion 44 can be cut off appropriately, to thereby inhibit a current from flowing when the battery pack 40 is abnormal.

Thus, according to the battery pack 40 of the present embodiment, even when at least one of the cut-off switches 70 and 72 is abnormal, it is possible to inhibit a current from flowing when the battery pack 40 is abnormal, by turning the cut-off switch 70 or the cut-off switch 72 to a cut-off state (OFF).

In the battery pack 40, prior to determining whether the cut-off switches 70 and 72 are normal or abnormal, the control circuit 60 turns the cut-off switch 70 to a cut-off state (OFF), and turns the cut-off switch 72 to an energized state (ON). Then, under such conditions, the control circuit 60 determines whether the cut-off switch 70 is normal or abnormal based on a potential in the path L2Ba extending from the cut-off switch 70 to the negative terminal 44B of the power-supply terminal portion 44 in the negative power-supply line L2B.

Specifically, when the cut-off switch 70 is turned to a cut-off state and the cut-off switch 72 is turned to an energized state, the potential in the path L2Ba is a value independent of a potential in the negative terminal 50B of the battery 50 if the cut-off switch 70 is normal. However, if the cut-off switch 70 is abnormal (short-circuit abnormality state), the potential in the path L2Ba is approximately the same as that in the negative terminal 50B of the battery 50.

Thus, it is possible to determine whether the cut-off switch 70 is normal or abnormal based on the potential in the path L2Ba under the conditions in which the cut-off switch 70 is turned to a cut-off state (OFF) and the cut-off switch 72 is turned to an energized state (ON).

The battery pack 40 includes the state determination circuit 76 connecting the path L2Aa in the positive power-supply line L2A and the path L2Ba in the negative power-supply line L2B to each other.

The potential Vch varies according to a potential in the path L2Aa or the potential in the path L2Ba, and thus, the potential Vch can be used to determine whether the cut-off switches 70 and 72 are normal or abnormal. It is to be noted that the potential in the path L2Ba includes a potential in the cut-off switch 70 and that the potential in the path L2Aa includes a potential in the cut-off switch 72.

For example, when a state (normal or abnormal) of the cut-off switch 70 is to be determined, if the cut-off switch 70 is normal under the conditions in which the cut-off switch 70 is turned to a cut-off state (OFF) and the cut-off switch 72 is turned to an energized state (ON), a current flows from the path L2Aa to a ground via the resistor R11 and the zener diode DZ1. At such a time, the potential Vch is a potential corresponding to the breakdown voltage (2.0 [V], in the present embodiment) of the zener diode DZ1.

If the cut-off switch 70 is abnormal (short-circuit abnormality state) under the conditions in which the cut-off switch 70 is turned to a cut-off state (OFF) and the cut-off switch 72 is turned to an energized state (ON), a current flows from the path L2Aa to the battery 50 via the resistor R11, the diode D4, and the cut-off switch 70. Thus, the potential Vch is a potential corresponding to the forward voltage of the diode D4.

In this way, the control circuit 60 can determine whether the cut-off switch 70 is normal or abnormal based on the potential Vch.

When the cut-off switch 70 is turned OFF in a state where the battery pack 40 is not connected to the power tool body 10 or the charger 80, if the cut-off switch 72 (the protection circuit F1, specifically) is normal (a state in which the fuse portion 72a is not melt-cut), the potential Vch is a high potential corresponding to the breakdown voltage of the zener diode DZ1, as described above.

In contrast, if the cut-off switch 72 is in a disconnection failure state (if the fuse portion 72a is melt-cut, or if the heater portion 72b is in an open failure state), the potential Vch is a low potential corresponding to a ground potential, as described above.

In this way, the control circuit 60 can determine whether the cut-off switch 72 is normal or abnormal based on the potential Vch.

That is, in the battery pack 40, the state determination circuit 76 makes it possible to determine whether the cut-off switches 70 and 72 are normal or abnormal.

Next, in the battery pack 40, the control circuit 60 determines states of the cut-off switches 70 and 72 after the battery pack 40 is disconnected from the charger 80.

For a while shortly after the battery pack 40 is disconnected from the charger 80, the battery pack 40 is not connected to an external device (charger, motor-driven appliance, or the like) and neither charge nor discharge of the battery 50 is performed. Thus, it is an appropriate timing for checking states of the cut-off switches 70 and 72.

Consequently, since the battery pack 40 determines states of the cut-off switches 70 and 72 at a timing appropriate for checking the states of the cut-off switches 70 and 72, the states of the cut-off switches 70 and 72 can be determined appropriately.

Next, in the battery pack 40, the cut-off switch 70 includes the switching elements Q2 and Q3 that are connected in series to the negative power-supply line L2B and that can be selectively turned ON and OFF, and the cut-off switch 72 includes the protection circuits F1-F3 each having the fuse portion 72a connected in series to the positive power-supply line L2A and the heater portion 72b serving as a heating element to melt-cut the fuse portion 72a.

When the control circuit 60 determines that the cut-off switch 70 is abnormal, the control circuit 60 energizes the heater portion 72b in the cut-off switch 72 and melt-cuts the fuse portion 72a to thereby cut off the positive power-supply line L2A.

In this way, by energizing the heater portion 72b in the cut-off switch 72 to melt-cut the fuse portion 72a, it is possible to reliably inhibit a current from flowing through the positive power-supply line L2A and the negative power-supply line L2B when the battery pack 40 is abnormal, even in the case where the cut-off switch 70 is abnormal.

Next, in the battery pack 40, the control circuit 60 determines whether the cut-off switch 72 is normal or abnormal based on a potential in the heater portion 72b in the cut-off switch 72.

Specifically, when the cut-off switch 72 having the protection circuit F1 is normal, the potential in the heater portion 72b is approximately equal to that in the positive terminal 50A of the battery 50, but when the cut-off switch 72 having the protection circuit F1 is abnormal (disconnection failure state, especially), the potential in the heater portion 72b is independent of a potential in the positive terminal 50A of the battery 50.

Thus, it is possible to determine whether the cut-off switch 72 having the protection circuit F1 is normal or abnormal based on the potential in the heater portion 72b.

Next, in the battery pack 40, the cut-off switch 72 includes a plurality of the protection circuits F1-F3 connected in parallel to each other. By using the cut-off switch 72 including the thus-connected plurality of protection circuits F1-F3, energization via the cut-off switch 72 can be performed even in a case where a charge current or a discharge current is a large current.

The control circuit 60 determines whether the cut-off switch 72 is normal or abnormal based on the potential in one of a plurality of the heater portions 72b. In the plurality of protection circuits F1-F3 connected in parallel to each other, when any one of the protection circuits becomes abnormal (disconnection abnormality state) because of overcurrent, such overcurrent also flows through the other protection circuits, and all protection circuits are highly likely to become abnormal (disconnection abnormality state) eventually. Thus, the need to make a determination for each of the plurality of protection circuits is reduced, and a state of the cut-off switch 72 can be determined based on the potential in the heater portion 72b in one protection circuit.

The battery pack 40 includes a plurality of the switching elements Q4-Q6, each of which is connected to the heater portion 72b in each of the protection circuits F1-F3 to allow a current for melt-cutting the fuse portion 72a to flow through the heater portion 72b.

In this way, the plurality of protection circuits F1-F3 can be normally operated owing to the existence of the plurality of switching elements Q4-Q6, respectively, each connected to the heater portion 72b in each of the protection circuits F1-F3, respectively.

If the plurality of heater portions 72b are energized via a single switching element, they are connected to such a switching element with one ends thereof brought together into one. In such a case, the plurality of heater portions 72b are configured to be electrically connected to each other without interposition of the switching elements, and thus, an unexpectedly large current may flow through the plurality of heater portions 72b in spite of the current control by the switching element. If such an unexpectedly large current is generated, the fuse portion 72a may be melt-cut at an inappropriate timing.

To cope with this, the plurality of switching elements Q4-Q6 each connected to the heater portion 72b in each of the plurality of protection circuits F1-F3 are respectively provided, to thereby make it possible to inhibit an unexpectedly large current from flowing serially through the plurality of heater portions 72b and to normally operate each of the plurality of protection circuits F1-F3.

Next, in the battery pack 40, when at least one of the cut-off switches 70 and 72 is determined to be abnormal, the flash ROM 60d in the control circuit 60 stores information that the battery pack 40 is in a prohibited state.

Due to such a configuration, when an external device (the charger 80, the power tool body 10, or the like) is connected to the battery pack 40, the control circuit 60 can determine whether the battery pack 40 is in a prohibited state based on the information stored in the flash ROM 60d. If the battery pack 40 is in a prohibited state, charge and discharge thereof can be prohibited by means of software or the like. Even when the battery pack 40 is attached to the charger 80 to thereby activate the control circuit 60 (microcomputer) after the shutdown switch SW1 is opened to shut down the battery pack 40 because of overdischarge, it is possible to prohibit charge thereto reliably and also to prohibit a subsequent discharge therefrom because the information is stored in the flash ROM 60d.

According to the thus-configured battery pack 40, reliability in terms of safety is improved because charge and discharge thereof can be prohibited by means of both software and hardware.

Next, in the battery pack 40, the cut-off switch 72 is provided in a path in the positive power-supply line L2A, through which path both a charge current and a discharge current flow.

Specifically, in a case where the cut-off switch 72 in the positive power-supply line L2A is provided in a path through which only a charge current flows or in a path through which only a discharge current flows, either of the charge current or the discharge current can be inhibited from flowing but the other current cannot be inhibited from flowing.

To cope with this, the cut-off switch 72 is provided in the path through which both a charge current and a discharge current flow, and each of the charge current and the discharge current can thereby be inhibited from flowing when the battery pack 40 is abnormal, which is not the case where only any one of the charge current and the discharge current can be inhibited from flowing when the battery pack is abnormal.

In the present embodiment, the battery cells B1-Bn correspond to an example of a rechargeable battery of the present disclosure, the battery 50 corresponds to an example of a battery of the present disclosure, the control circuit 60 corresponds to an example of a control unit of the present disclosure, the positive terminal 44A and the negative terminal 44B of the power-supply terminal portion 44 correspond to an example of a pair of external terminals of the present disclosure, and the negative terminal 44B of the power-supply terminal portion 44 end the connection terminal 46D of the connection terminal portion 46 correspond to an example of a pair of external terminals of the present disclosure. The positive terminal 44A of the power-supply terminal portion 44 corresponds to an example of a second external terminal of the present disclosure, the negative terminal 44B of the power-supply terminal portion 44 corresponds to an example of a first external terminal of the present disclosure, and the connection terminal 46D of the connection terminal portion 46 corresponds to an example of a second external terminal of the present disclosure. The positive terminal 50A corresponds to an example of a positive electrode of the present disclosure, and the negative terminal 50B corresponds to an example of a negative electrode of the present disclosure.

The positive power-supply line L2A and the negative power-supply line L2B correspond to an example of a power supply path of the present disclosure, the cut-off switch 70 corresponds to an example of a first current cut-off unit of the present disclosure, the cut-off switch 72 corresponds to an example of a second current cut-off unit of the present disclosure, and the state determination circuit 76 corresponds to an example of a state determination circuit of the present disclosure. The path L2Ba corresponds to an example of a first power supply path of the present disclosure, and the path L2Aa corresponds to an example of a second power supply path of the present disclosure.

The switching elements Q2 and Q3 in the cut-off switch 70 correspond to an example of switching elements in the first current cut-off unit of the present disclosure, the protection circuits F1-F3 in the cut-off switch 72 correspond to an example of a protection circuit in the second current cut-off unit of the present disclosure, the fuse portion 72a corresponds to an example of a fuse of the present disclosure, the heater portion 72b corresponds to an example of a heating element of the present disclosure, the switching elements Q4-Q6 correspond to an example of an energization control unit of the present disclosure, and the flash ROM 60d in the control circuit 60 corresponds to an example of a storage unit of the present disclosure.

[Second Embodiment]

In the above-described embodiment (hereinafter also referred to as a first embodiment), an explanation has been given of the battery pack 40 including the cut-off switch 72 having the protection circuits F1-F3, as a second current cut-off unit provided in a power supply path extending from a positive electrode of a battery to an external terminal. However, the second current cut-off unit may comprise a cut-off switch including switching elements.

Thus, as a second embodiment, an explanation will be given of a second battery pack 140 in which the second current cut-off unit comprises a cut-off switch 172 including switching elements Q7 and Q8.

It is to be noted that the second battery pack 140 of the second embodiment is configured such that the cut-off switch 72 is replaced by the cut-off switch 172 compared with the battery pack 40 of the first embodiment, though elements such as the battery 50 and the cut-off switch 70 are the same as or similar to those in the first embodiment. Thus, in the explanation below, the elements that are the same as or similar to those in the first embodiment will be described with the same reference numerals assigned thereto, and differences from the first embodiment will be mainly described.

Figure 6:
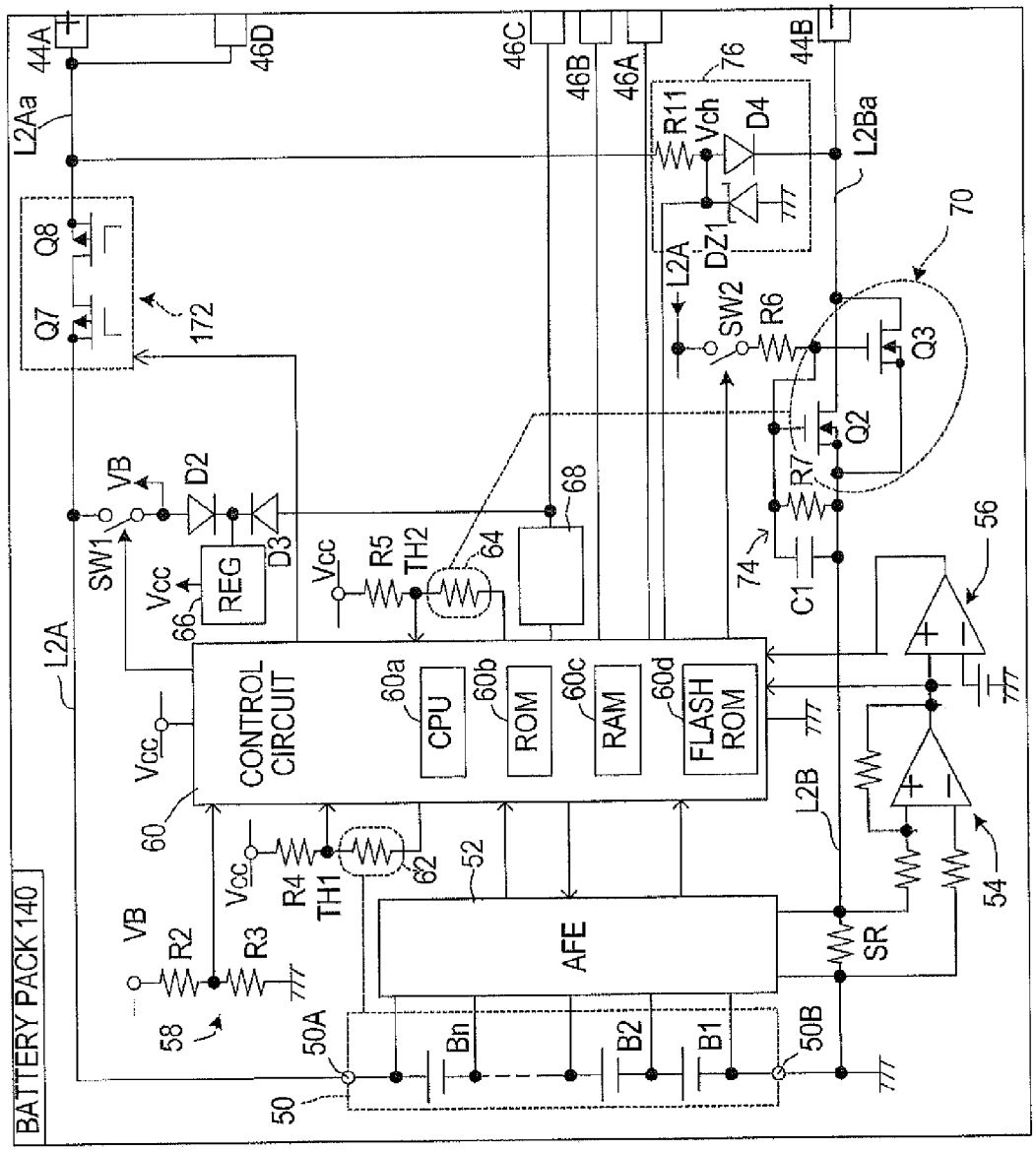
FIG. 6 is a block diagram showing a circuit configuration of a battery pack of a second embodiment.

As shown in FIG. 6, the second battery pack 140 includes the cut-off switch 172 provided in the positive power-supply line L2A extending from the positive terminal 50A of the battery 50 to the positive terminal 44A.

Here, the cut-off switch 172 includes the two switching elements Q7 and Q8 connected in series to each other. The switching elements Q7 and Q8 each comprise a p-channel MOSFET.

In the switching element Q7, a source is connected to the positive terminal 50A of the battery 50, and a drain is connected to a drain of the switching element Q8. A source of the switching element Q8 is connected to the positive terminal 44A of the second battery pack 140.

The two switching elements Q7 and Q8 are configured to be capable of being concurrently turned ON or OFF based on a command signal from the control circuit 60. Specifically, when the switching elements Q7 and Q8 are turned ON based on the command signal, the positive power-supply line L2A becomes a conductive state, and a charge current or a discharge current flows to or from the battery 50. When the switching elements Q7 and Q8 are both turned OFF based on the command signal, the positive power-supply line L2A is cut off.

The path L2Aa between the cut-off switch 172 and the positive terminal 44A of the power-supply terminal portion 44 in the positive power-supply line L2A is connected to the negative power-supply line L2B via the state determination circuit 76.

The state determination circuit 76 is provided in order to determine states (normal or abnormal) of the cut-off switches 70 and 172 when the second battery pack 140 is not connected to the power tool body 10 or the charger 80. Specifically, the state determination circuit 76 is used to check whether the cut-off switches 70 and 172 are each not in a short-circuit failure state.

Specifically, when the cut-off switch 70 is turned OFF and the cut-off switch 172 is turned ON in the state where the second battery pack 140 is not connected to the power tool body 10 or the charger 80, if the cut-off switch 70 is normal, a high voltage that is higher than a breakdown voltage is applied to the zener diode DZ1 via the resistor R11, and a very small current flows through the zener diode DZ1. Thus, a potential Vch at the interconnection point between the resistor R11 and the zener diode DZ1 in the state determination circuit 76 is a high potential corresponding to the breakdown voltage of the zener diode DZ1.

In contrast, if the cut-off switch 70 is in a short-circuit failure state, a forward current flows through the diode D4 via the resistor R11, and thus, the potential Vch at the interconnection point between the resistor R11 and the diode D4 (the interconnection point between the resistor R11 and the zener diode DZ1, in other words) in the state determination circuit 76 is a low potential corresponding to a forward voltage (0.6-0.7 V) of the diode D4.

When the cut-off switches 70 and 172 are each turned OFF in the state where the second battery pack 140 is not connected to the power tool body 10 or the charger 80, if the cut-off switch 172 is normal, the positive terminal 50A of the battery 50 and the state determination circuit 76 are electrically insulated from each other by means of the cut-off switch 172, and no current flows through the state determination circuit 76. At such a time, the potential Vch is a low potential corresponding to a ground potential.

In contrast, if the cut-off switch 172 is in a short-circuit failure state in the state where the cut-off switches 70 and 172 are each turned OFF, a high voltage higher than the breakdown voltage is applied to the zener diode DZ1 via the resistor R11, and a very small current flows through the zener diode DZ1. Thus, the potential Vch is a high potential corresponding to the breakdown voltage of the zener diode DZ1.

As a result, when the control circuit 60 turns the cut-off switch 70 OFF and turns the cut-off switch 172 ON in the state where the second battery pack 140 is not connected to the power tool body 10 or the charger 80, the control circuit 60 takes in the potential Vch to thereby perform a failure determination (state determination) of the cut-off switch 70. In addition, when the control circuit 60 turns the cut-off switches 70 and 172 each OFF in the state where the second battery pack 140 is not connected to the power tool body 10 or the charger 80, the control circuit 60 takes in the potential Vch to thereby perform a failure determination (state determination) of the cut-off switch 172.

[Cut-Off Unit State Determination Process in Second Embodiment]

Here, an explanation will be given of the details of the cut-off unit state determination process for determining states of the cut-off switches 70 and 172.

The cut-off unit state determination process is a process for determining states (normal or abnormal) of the cut-off switches 70 and 172, and is performed when the charger detection circuit 68 determines that the second battery pack 140 is connected to the charger 80. It is determined whether each of the cut-off switches 70 and 172 is in a short-circuit abnormality state.

Figure 7:
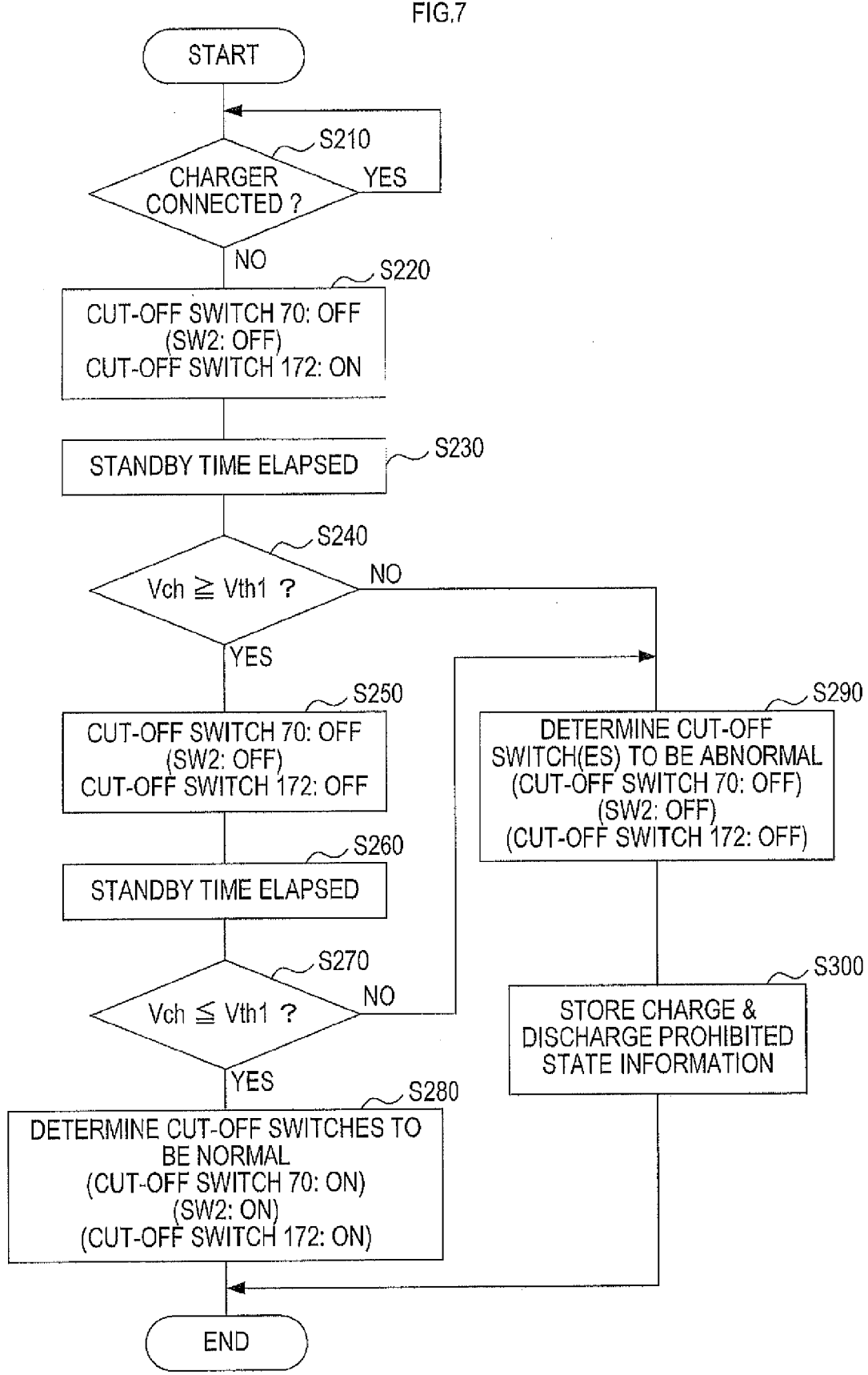
FIG. 7 is a flowchart showing a cut-off unit state determination process performed by a control circuit in the battery pack of the second embodiment.

The cut-off unit state determination process of the second embodiment is performed in accordance with a flowchart shown in FIG. 7.

When the cut-off unit state determination process is activated, first in S210, it is determined whether the charger 80 is in a connection state. If an affirmative determination is made, S210 is performed repeatedly, and if a negative determination is made, the process proceeds to S220.

In S220, the cut-off switch 70 (the pair of switching elements Q2 and Q3) is turned OFF, and the cut-off switch 172 (the switching elements Q7 and Q8) is turned ON.

Specifically, the control switch SW2 is turned OFF to thereby turn the cut-off switch 70 OFF, and a command signal to turn the cut-off switch 172 ON is outputted to thereby turn the cut-off switch 172 ON.

In this way, the negative power-supply line L2B becomes a cut-off state by means of the cut-off switch 70, and the negative terminal 50B of the battery 50 and the negative terminal 44B of the power-supply terminal portion 44 are electrically cut off from each other. On the other hand, the positive power-supply line L2A becomes a conductive state by means of the cut-off switch 172, and the positive terminal 50A of the battery 50 and the positive terminal 44A of the power-supply terminal portion 44 are electrically connected to each other.

Next, in S230, a standby state continues until elapse of a specified standby time (100 [msec], in the present second embodiment).

Next, in S240, it is determined whether the potential Vch is equal to or greater than the specified determination reference value Vth1 (1.5 [V], in the present second embodiment). If an affirmative determination is made, the process proceeds to S250, and if a negative determination is made, the process proceeds to S290.

As described above, when the cut-off switch 70 is turned OFF and the cut-off switch 172 is turned ON in the state where the second battery pack 140 is not connected to the power tool body 10 or the charger 80, if the cut-off switch 70 is normal, the potential Vch is a high potential corresponding to the breakdown voltage of the zener diode DZ1. In contrast, if the cut-off switch 70 is in a short-circuit failure state, the potential Vch is a low potential corresponding to the forward voltage (0.6-0.7 V) of the diode D4.

Thus, as the determination reference value Vth1, a boundary value between the breakdown voltage (2.0 [V], in the present second embodiment) of the zener diode DZ1 and the forward voltage (0.6-0.7 V) of the diode D4 is set.

If an affirmative determination is made in S240, the process proceeds to S250. In S250, the cut-off switch 70 (the pair of switching elements Q2 and Q3) is turned OFF, and the cut-off switch 172 (the switching elements Q7 and Q8) is also turned OFF.

Specifically, the control switch SW2 is turned OFF to thereby turn the cut-off switch 70 OFF, and a command signal to turn the cut-off switch 172 OFF is outputted to thereby turn the cut-off switch 172 OFF.

In this way, the negative power-supply line L2B becomes a cut-off state by means of the cut-off switch 70, and the negative terminal 50B of the battery 50 and the negative terminal 44B of the power-supply terminal portion 44 are electrically cut off from each other. On the other hand, the positive power-supply line L2A also becomes a cut-off state by means of the cut-off switch 172, and the positive terminal 50A of the battery 50 and the positive terminal 44A of the power-supply terminal portion 44 are electrically cut off from each other.

Next, in S260, a standby state continues until elapse of a specified standby time (100 [msec], in the present second embodiment).

Next, in S270, it is determined whether the potential Vch is equal to or smaller than the specified determination reference value Vth1 (1.5 [V], in the present second embodiment). If an affirmative determination is made, the process proceeds to S280, and if a negative determination is made, the process proceeds to S290.

When an affirmative determination is made in S270 and the process proceeds to S280, it is determined in S280 that the cut-off switches 70 and 172 are both normal, and the cut-off switches 70 and 172 are each turned ON.

In this way, the negative terminal 50B of the battery 50 and the negative terminal 44B of the power-supply terminal portion 44 are electrically connected to each other, and the positive terminal 50A of the battery 50 and the positive terminal 44A of the power-supply terminal portion 44 are electrically connected to each other.

When a negative determination is made in S240 or S270 and the process proceeds to S290, it is determined in S290 that at least one of the cut-off switches 70 and 172 is abnormal, and the cut-off switches 70 and 172 are each turned OFF.

In this way, at least one of the positive power-supply line L2A and the negative power-supply line L2B becomes a cut-off state, and the electrical connection between the battery 50 and the power-supply terminal portion 44 can be cut off appropriately. As a result, a current can be inhibited from flowing in a case where the power tool body 10 is connected to the second battery pack 140 when the second battery pack 140 is abnormal. That is, even when at least one of the cut-off switches 70 and 172 is abnormal, it is possible to inhibit a current from flowing when the second battery pack 140 is abnormal.

Next, in S300, information that the second battery pack 140 is in a state in which charge and discharge thereof are prohibited (prohibited state) is stored in the flash ROM 60d. In this way, it becomes possible to inform the power tool body 10 or the charger 80 that the second battery pack 140 is in a "prohibited state" when the power tool body 10 or the charger 80 is connected to the second battery pack 140.

When the process in S280 or S300 is complete, the cut-off unit state determination process ends.

[Effects of Second Embodiment]

As described above, the second battery pack 140 of the present second embodiment includes the cut-off switch 70 provided in the negative power-supply line L2B extending from the negative terminal 50B of the battery 50 to the negative terminal 44B of the power-supply terminal portion 44, and the cut-off switch 172 provided in the positive power-supply line L2A extending from the positive terminal 50A of the battery 50 to the positive terminal 44A of the power-supply terminal portion 44.

The cut-off switches 70 and 172 both comprise the switching elements.

The control circuit 60 turns the cut-off switches 172 and 70 OFF (cut-off state) prior to determining whether the cut-off switch 172 is normal or abnormal (S250). Then, under such conditions, the control circuit 60 determines whether the cut-off switch 172 is normal or abnormal based on the potential in the path L2Aa.

Specifically, when the cut-off switches 172 and 70 are turned to a cut-off state, if the cut-off switch 172 is normal, the potential in the path L2Aa is a value independent of the potential in the positive terminal 50A of the battery 50. However, if the cut-off switch 172 is abnormal (short-circuit abnormality state, specifically), the potential in the path L2Aa is approximately the same as that in the positive terminal 50A of the battery 50.

Thus, it is possible to determine whether the cut-off switch 172 is normal or abnormal based on the potential in the path L2Aa under the conditions in which the cut-off switches 172 and 70 are turned to a cut-off state.

In the second battery pack 140, when at least one of the cut-off switches 70 and 172 is abnormal, the control circuit 60 turns the cut-off switch 70 or 172 to a cut-off state (OFF), similarly to the battery pack 40 of the first embodiment. In this way, the electrical connection between the battery 50 and the power-supply terminal portion 44 can be cut off appropriately, and thus, a current can be inhibited from flowing when the second battery pack 140 is abnormal.

Consequently, according to the second battery pack 140, even when at least one of the cut-off switches 70 and 172 is abnormal, it is possible to inhibit a current from flowing when the second battery pack 140 is abnormal, by turning the cut-off switch 70 or 172 to a cut-off state (OFF).

The cut-off switch 70 corresponds to an example of the first current cut-off unit of the present disclosure, the cut-off switch 172 corresponds to an example of the second current cut-off unit of the present disclosure. The switching elements Q2 and Q3 in the cut-off switch 70 correspond to an example of the switching elements in the first current cut-off unit of the present disclosure, and the switching elements Q7 and Q8 in the cut-off switch 172 correspond to an example of the switching elements in the second current cut-off unit of the present disclosure.

[Third Embodiment]

Next, as a third embodiment, an explanation will be given of a third battery pack 240 configured such that at least the state determination circuit 76 in the battery pack 40 of the above-described first embodiment is replaced by a second state determination circuit 276.

The third battery pack 240 includes a temperature detection circuit 296 instead of the resistors R4 and R5 for detecting the cell temperature TH1 and the substrate temperature TH2 using the thermistors 62 and 64, which are temperature detection elements, in the battery pack 40 of the first embodiment.

It is to be noted that the third battery pack 240 of the third embodiment is configured such that at least the state determination circuit 76 and the resistors R4 and R5 are replaced by the second state determination circuit 276 and the temperature detection circuit 296, respectively, compared with the battery pack 40 of the first embodiment, though elements such as the battery 50, the cut-off switch 70, and the cut-off switch 72 are the same as or similar to those in the first embodiment. Thus, in the explanation below, the elements that are the same as or similar to those in the first embodiment will be described with the same reference numerals assigned thereto, and differences from the first embodiment will be mainly described.

Figure 8:
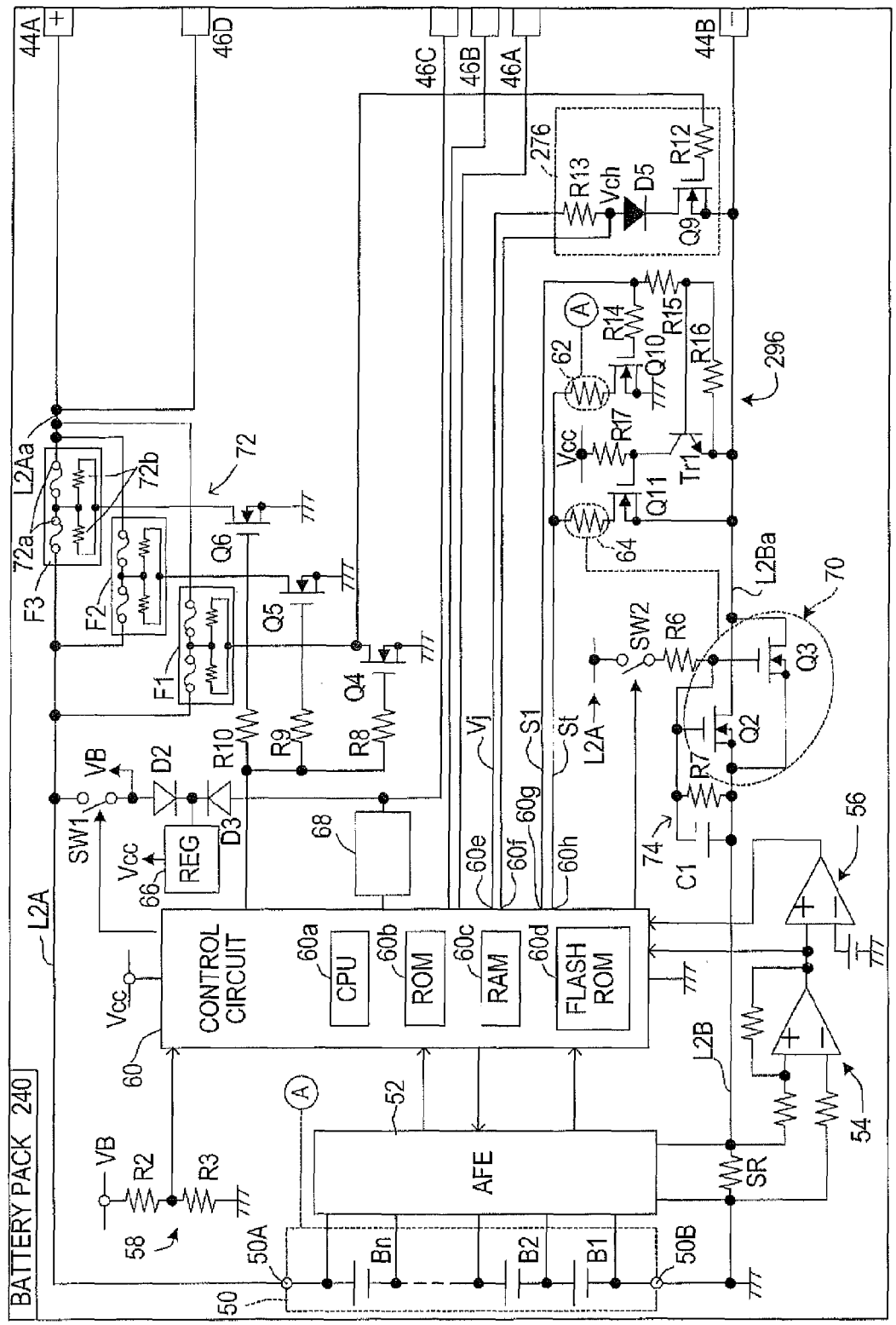
FIG. 8 is a block diagram showing a circuit configuration of a battery pack of a third embodiment.

As shown in FIG. 8, the third battery pack 240 includes the second state determination circuit 276 and the temperature detection circuit 296.

The second state determination circuit 276 includes a switching element Q9, resistors R12 and R13, and a diode D5.

The switching element Q9 comprises an n-channel MOSFET. In the switching element Q9, a gate is connected to the drain of the switching element Q4 via the resistor R12, a drain is connected to a cathode of the diode D5, and a source is connected to the path L2Ba in the negative power-supply line L2B. An anode of the diode D5 is connected to a voltage output terminal 60e of the control circuit 60 via the resistor R13. An interconnection point (potential Vch) between the anode of the diode D5 and the resistor R13 is connected to a determination input terminal 60f of the control circuit 60.

When a potential difference is generated between the negative power-supply line L2B (the path L2Ba, specifically) and the positive power-supply line L2A (the path L2Aa), the switching element Q9 becomes a state in which a current is allowed to flow from the drain thereof to the source thereof (ON), and thus, the cathode of the diode D5 and the negative power-supply line L2B (the path L2Ba, specifically) are electrically connected to each other. In contrast, when no potential difference is generated between the negative power-supply line L2B (the path L2Ba, specifically) and the positive power-supply line L2A (the path L2Aa), the switching element Q9 becomes a state in which a current is prohibited from flowing from the drain thereof to the source thereof (OFF), and thus, the cathode of the diode D5 and the negative power-supply line L2B (the path L2Ba, specifically) are electrically cut off from each other.

Thus, the potential Vch varies depending on whether a potential difference is generated between the negative power-supply line L2B (the path L2Ba, specifically) and the positive power-supply line L2A (the path L2Aa). Thus, the potential Vch can be used to determine whether the cut-off switches 70 and 72 are normal or abnormal.

That is, the second state determination circuit 276 is provided in order to determine states (normal or abnormal) of the cut-off switches 70 and 72 when the third battery pack 240 is not connected to the power tool body 10 or the charger 80. Specifically, the second state determination circuit 276 is used to check whether the cut-off switch 70 is in a short-circuit abnormality state and whether the cut-off switch 72 is in a disconnection abnormality state.

For example, when a state (normal or abnormal (short-circuit abnormality state, especially)) of the cut-off switch 70 is to be determined, a drive voltage Vj outputted from the voltage output terminal 60e is set at a high level (3.3 [V], in the present third embodiment), while the cut-off switch 70 is turned OFF (cut-off state) and the cut-off switch 72 is turned ON (energized state). Under such conditions, if the cut-off switches 70 and 72 are both normal, no potential difference is generated between the negative power-supply line L2B (the path L2Ba, specifically) and the positive power-supply line L2A (the path L2Aa).

Because of this, the switching element Q9 electrically cuts off the cathode of the diode D5 and the negative power-supply line L2B (the path L2Ba, specifically) from each other, and thus, a current running from the voltage output terminal 60e toward the negative terminal 50B of the battery 50 via the resistor R13, the diode D5, the switching element Q9, the path L2Ba, and the cut-off switch 70 does not flow. At such a time, the potential Vch is a potential corresponding to the drive voltage Vj outputted from the voltage output terminal 60e.

In contrast, if the cut-off switch 70 is in a short-circuit abnormality state and the cut-off switch 72 is normal under the conditions in which the drive voltage Vj is set at a high level while the cut-off switch 70 is turned OFF and the cut-off switch 72 is turned ON, a potential difference is generated between the negative power-supply line L2B (the path L2Ba, specifically) and the positive power-supply line L2A (the path L2Aa).

Because of this, the switching element Q9 electrically connects the cathode of the diode D5 and the negative power-supply line L2B (the path L2Ba, specifically) to each other, and thus, the current running from the voltage output terminal 60e toward the negative terminal 50B of the battery 50 via the resistor R13, the diode D5, the switching element Q9, the path L2Ba, and the cut-off switch 70 does flow. At such a time, the potential Vch is not a potential corresponding to the drive voltage Vj outputted from the voltage output terminal 60e but a potential corresponding to a voltage drop in the diode D5, the switching element Q9, the path L2Ba, and the cut-off switch 70 (i.e., a potential close to a ground potential).

Consequently, it is possible to determine a state (normal or abnormal) of the cut-off switch 70 by measuring the potential Vch under the conditions in which the drive voltage Vj is set at a high level while the cut-off switch 70 is turned OFF and the cut-off switch 72 is turned ON, and by using the measured potential Vch.

On the other hand, when a state (normal or abnormal (disconnection abnormality state, especially)) of the cut-off switch 72 is to be determined, the drive voltage Vj outputted from the voltage output terminal 60e is set at a high level, while the cut-off switch 70 is turned ON (energized state) and the cut-off switch 72 is also turned ON (energized state). Under such conditions, if the cut-off switches 70 and 72 are both normal, a potential difference is generated between the negative power-supply line L2B (the path L2Ba, specifically) and the positive power-supply line L2A (the path L2Aa).

Because of this, the switching element Q9 electrically connects the cathode of the diode D5 and the negative power-supply line L2B (the path L2Ba, specifically) to each other, and thus, the current running from the voltage output terminal 60e toward the negative terminal 50B of the battery 50 via the resistor R13, the diode D5, the switching element Q9, the path L2Ba, and the cut-off switch 70 does flow. At such a time, the potential Vch is not a potential corresponding to the drive voltage Vj outputted from the voltage output terminal 60e but a potential corresponding to a voltage drop in the diode D5, the switching element Q9, the path L2Ba, and the cut-off switch 70 (i.e., a potential close to a ground potential).

In contrast, if the cut-off switch 72 is in a disconnection abnormality state under conditions in which the drive voltage Vj is set at a high level while the cut-off switch 70 is turned ON and the cut-off switch 72 is also turned ON, no potential difference is generated between the negative power-supply line L2B (the path L2Ba, specifically) and the positive power-supply line L2A (the path L2Aa).

Because of this, the switching element Q9 electrically cuts off the cathode of the diode D5 and the negative power-supply line L2B (the path L2Ba, specifically) from each other, and thus, the current running from the voltage output terminal 60e toward the negative terminal 50B of the battery 50 via the resistor R13, the diode D5, the switching element Q9, the path L2Ba, and the cut-off switch 70 does not flow. At such a time, the potential Vch is a potential corresponding to the drive voltage Vj outputted from the voltage output terminal 60e.

Consequently, it is possible to determine a state (normal or abnormal) of the cut-off switch 72 by measuring the potential Vch under the conditions in which the drive voltage Vj is set at a high level while the cut-off switch 70 is turned ON and the cut-off switch 72 is also turned ON, and by using the measured potential Vch.

Thus, when the third battery pack 240 is not connected to the power tool body 10 or the charger 80, the control circuit 60 sets the drive voltage Vj at a high level and takes in the potential Vch in the second state determination circuit 276, to thereby perform a failure determination (state determination) of the cut-off switches 70 and 72 based on the potential Vch.

Details of the cut-off unit state determination process for determining states of the cut-off switches 70 and 72 will be described later.

Next, the temperature detection circuit 296 will be described.

The temperature detection circuit 296 includes a switching element Q10, a resistor R14, a switching element Tr1, a switching element Q11, and resistors R15-R17.

The switching element Q10 comprises an n-channel MOSFET. In the switching element Q10, a gate is connected to a temperature detection command output terminal 60g of the control circuit 60 via the resistor R14, a drain is connected to a temperature detection signal input terminal 60h of the control circuit 60 via the thermistor 62, and a source is connected to a ground potential. The gate of the switching element Q10 is also connected to the path L2Ba in the negative power-supply line L2B via the resistors R15 and R16.

The switching element Q11 comprises an n-channel MOSFET. In the switching element Q11, a gate is connected to a collector of the switching element Tr1, a drain is connected to the temperature detection signal input terminal 60h of the control circuit 60 via the thermistor 64, and a source is connected to the path L2Ba in the negative power-supply line L2B. The gate of the switching element Q11 is also connected, via the resistor R17, to a power-supply line through which the power-supply voltage Vcc is supplied.

The switching element Tr1 comprises an NPN transistor. In the switching element Tr1, a base is connected to the temperature detection command output terminal 60g of the control circuit 60 via the resistor R15, the collector is connected, via the resistor R17, to the power-supply line through which the power-supply voltage Vcc is supplied, and an emitter is connected to the path L2Ba in the negative power-supply line L2B. The resistor R16 is connected between the base and the emitter of the switching element Tr1.

In the thus-configured temperature detection circuit 296, when a temperature detection command signal S1 outputted from the temperature detection command output terminal 60g of the control circuit 60 becomes a high level, the switching elements Q10 and Tr1 are each turned ON (energized state), and the switching element Q11 is turned OFF (cut-off state).

At such a time, a current flows from the temperature detection signal input terminal 60h in a direction toward a ground via the thermistor 62 and the switching element Q10, and a voltage generated at both ends of a series circuit extending from the thermistor 62 to the switching element Q10 (a potential inputted into the temperature detection signal input terminal 60h, in other words) varies according to a resistance value of the thermistor 62. Since the resistance value of the thermistor 62 varies according to the cell temperature TH1 of the battery 50, a potential detected at the temperature detection signal input terminal 60h when the temperature detection command signal S1 is at a high level can be used to detect the cell temperature TH1 of the battery 50.

In contrast, in the temperature detection circuit 296, when the temperature detection command signal S1 outputted from the temperature detection command output terminal 60g of the control circuit 60 becomes a low level, the switching elements Q10 and Tr1 are each turned OFF (cut-off state), and the switching element Q11 is turned ON (energized state).

At such a time, a current flows from the temperature detection signal input terminal 60h in a direction toward a ground via the thermistor 64 and the switching element Q11, and a voltage generated at both ends of a series circuit extending from the thermistor 64 to the switching element Q11 (a potential inputted into the temperature detection signal input terminal 60h, in other words) varies according to a resistance value of the thermistor 64. Since the resistance value of the thermistor 64 varies according to the substrate temperature TH2 of the substrate on which the cut-off switch 70 and the like are provided, a potential detected at the temperature detection signal input terminal 60h when the temperature detection command signal S1 is at a low level can be used to detect the substrate temperature TH2.

That is, when the temperature detection command signal S1 is at a low level, the temperature detection circuit 296 outputs a temperature detection signal St, a potential of which varies according to the substrate temperature TH2, to the temperature detection signal input terminal 60h; in contrast, when the temperature detection command signal S1 is at a high level, the temperature detection circuit 296 outputs a temperature detection signal St, a potential of which varies according to the cell temperature TH1 of the battery 50, to the temperature detection signal input terminal 60h.

By using the thus-configured temperature detection circuit 296, it becomes possible for the control circuit 60 to perform two kinds of temperature detection processes (the cell temperature TH1 of the battery 50 and the substrate temperature TH2) even in a case where only one input terminal of the control circuit 60 is available.

[Permanent Failure Setting Process in Third Embodiment]

Next, an explanation will be given of a permanent failure setting process performed by the control circuit 60.

The control circuit 60 performs the permanent failure setting process when at least one of a cell voltage, a charge current, and a discharge current is detected by the discharge current detection circuit 54 and the AFE 52 under conditions in which at least one of the cut-off switches 70 and 72 is determined to be abnormal (a "permanent failure level 1"). That is, the permanent failure setting process is not a process performed at specified intervals, but a process performed as an interrupt process when a current flowing through the negative power-supply line L2B is detected under conditions in which the "permanent failure level 1" is stored in the flash ROM 60d in the control circuit 60.

Figure 9:
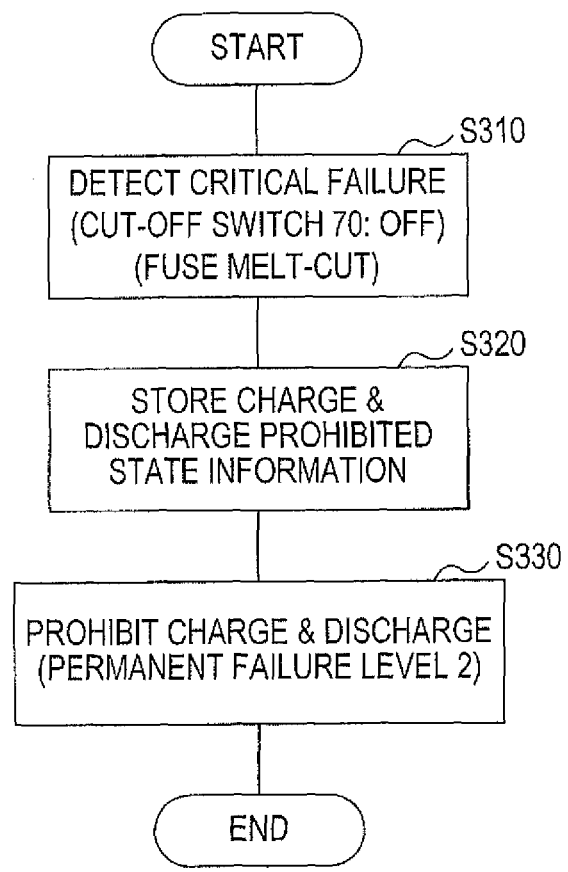
FIG. 9 is a flowchart showing a permanent failure setting process performed by a control circuit in the battery pack of the third embodiment.

The permanent failure setting process of the third embodiment is performed in accordance with a flowchart shown in FIG. 9.

When the permanent failure setting process is activated, first in S310, it is determined that the third battery pack 240 is in a critical failure state.

In S310, the cut-off switch 70 (the control switch SW2) is turned OFF, and the fuse portion 72a in each of the protection circuits F1-F3 in the cut-off switch 72 is melt-cut. Specifically, the switching elements Q4-Q6 are each turned ON to thereby melt-cut the fuse portion 72a by the heat generated in the heater portion 72b in each of the protection circuits F1-F3, respectively.

That is, when it is determined that the third battery pack 240 is in a critical failure state, the cut-off switch 70 is turned OFF (cut-off state) and the fuse portion 72a in the cut-off switch 72 is melt-cut, to thereby inhibit a charge current and a discharge current from flowing. Thus, a critical accident (such as overdischarge) is inhibited from occurring in the third battery pack 240.

Next, in S320, information that the third battery pack 240 is in a state in which charge and discharge thereof are prohibited (prohibited state) is stored in the flash ROM 60d in the control circuit 60. In this way, it becomes possible to inform the power tool body 10 or the charger 80 that the third battery pack 240 is in a "prohibited state" when the power tool body 10 or the charger 80 is connected to the third battery pack 240.

Next, in S330, a process of storing information that a state of the third battery pack 240 is a "permanent failure level 2" in the flash ROM 60d in the control circuit 60 is performed.

The "permanent failure level 2" is a failure level indicating that the third battery pack 240 is in a critical failure state, which level is more serious than the "permanent failure level 1" (a state in which at least one of the cut-off switches 70 and 72 is determined to be abnormal).

When the process in S330 is complete, the permanent failure setting process ends.

[Cut-Off Unit State Determination Process in Third Embodiment]

Here, an explanation will be given of the details of the cut-off unit state determination process for determining states of the out-off switches 70 and 72 in the third battery pack 240 of the third embodiment.

The cut-off unit state determination process is a process for determining states (normal or abnormal) of the cut-off switches 70 and 72, and is performed when the charger detection circuit 68 determines that the third battery pack 240 is connected to the charger 80. As for the cut-off switch 70, whether it is in a short-circuit abnormal state is determined, and as for the cut-off switch 72, whether it is in a disconnection abnormality state is determined.

Figure 10:
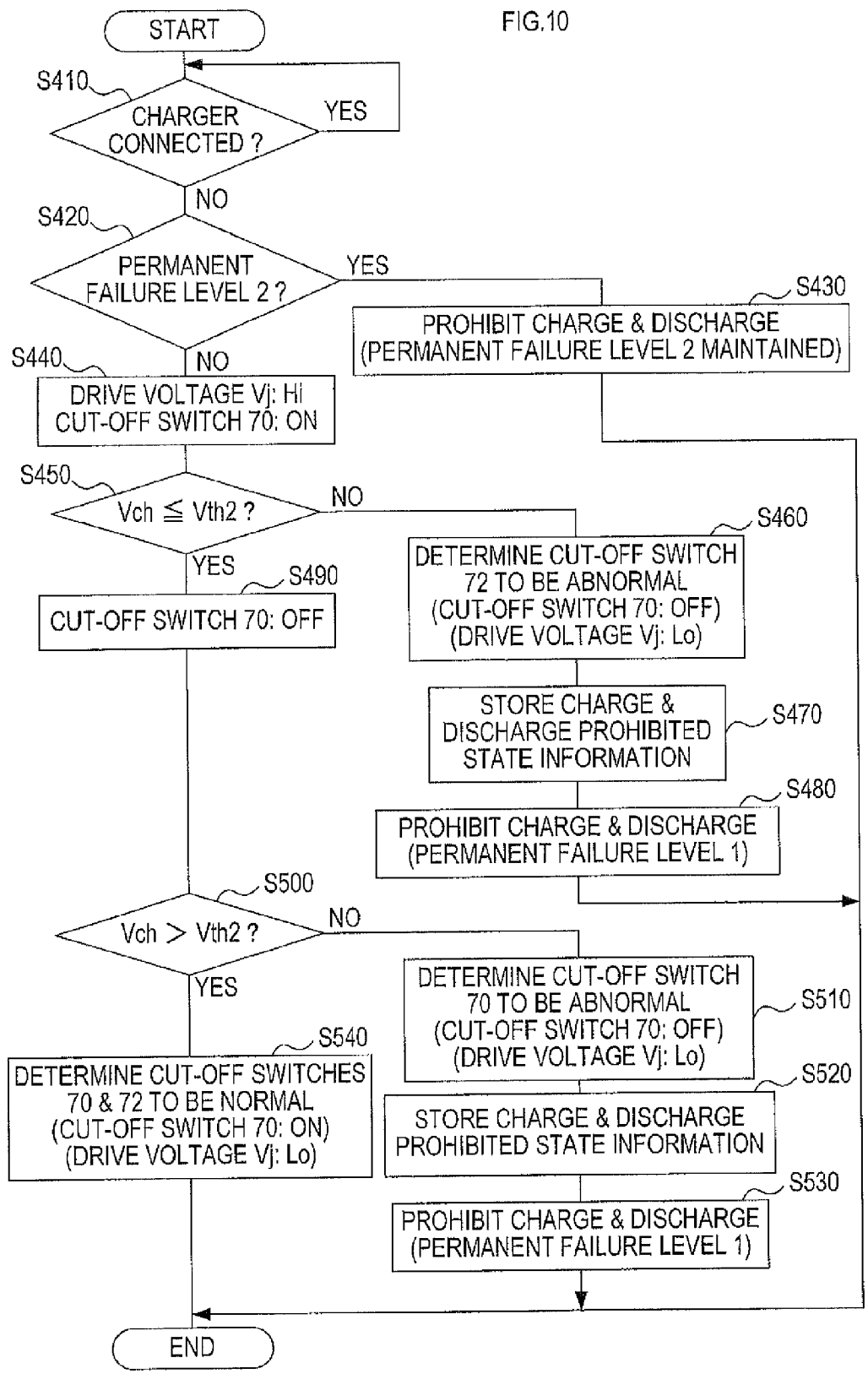
FIG. 10 is a flowchart showing a cut-off unit state determination process performed by the control circuit in the battery pack of the third embodiment.

The cut-off unit state determination process of the third embodiment is performed in accordance with flowcharts shown in FIG. 10.

When the cut-off unit state determination process is activated, first in S410, it is determined whether the charger 80 is in a connection state. If an affirmative determination is made, S410 is performed repeatedly, and if a negative determination is made, the process proceeds to S420.

In S420, it is determined whether the "permanent failure level 2" is stored, as a state of the third battery pack 240, in the flash ROM 60d in the control circuit 60. If an affirmative determination is made, the process proceeds to S430, and if a negative determination is made, the process proceeds to S440.

The "permanent failure level 2" is stored in the flash ROM 60d in the control circuit 60 when the permanent failure setting process is performed, as described above.

When an affirmative determination is made in S420 and the process proceeds to S430, in S430, the information that the third battery pack 240 is in a state in which charge and discharge thereof are prohibited (prohibited state) is stored in the flash ROM 60d in the control circuit 60. In this way, it becomes possible to inform the power tool body 10 or the charger 80 that the third battery pack 240 is in a "prohibited state" when the power tool body 10 or the charger 80 is connected to the third battery pack 240. A state in which the "permanent failure level 2" is stored in the flash ROM 60d is maintained.

When a negative determination is made in S420 and the process proceeds to S440, in S440, the drive voltage Vj is set at a high level and the cut-off switch 70 is turned ON (specifically, the control switch SW2 is turned ON).

Next, in S450, it is determined whether the potential Vch is equal to or smaller than a specified second determination reference value Vth2 (1.0 [V], in the present third embodiment). If an affirmative determination is made, the process proceeds to S490, and if a negative determination is made, the process proceeds to S460.

In S450, a failure determination (state determination) of the cut-off switch 72 is performed based on the potential Vch detected when the drive voltage Vj is at a high level and the cut-off switch 70 is ON (energized state).

When a negative determination is made in S450 and the process proceeds to S460, in S460, it is determined that the cut-off switch 72 (the protection circuit F1, specifically) is abnormal (disconnection abnormality state).

In S460, the cut-off switch 70 (the control switch SW2) is turned OFF and the drive voltage Vj is set at a low level.

As a result, the electrical connection between the battery 50 and the power-supply terminal portion 44 can be cut off appropriately, and a current can be inhibited from flowing in a case where the power tool body 10 is connected to the third battery pack 240 when the third battery pack 240 is abnormal. That is, even when the cut-off switch 72 is abnormal, it is possible to inhibit a current from flowing when the third battery pack 240 is abnormal.

Next, in S470, the information that the third battery pack 240 is in a state in which charge and discharge thereof are prohibited (prohibited state) is stored in the flash ROM 60d in the control circuit 60. In this way, it becomes possible to inform the power tool body 10 or the charger 80 that the third battery pack 240 is in a "prohibited state" when the power tool body 10 or the charger 80 is connected to the third battery pack 240.

Next, in S480, a process of storing information that a state of the third battery pack 240 is the "permanent failure level 1" in the flash ROM 60d in the control circuit 60 is performed.

The "permanent failure level 1" is a failure level indicating that at least one of the cut-off switches 70 and 72 is determined to be abnormal.

When an affirmative determination is made in S450 and the process proceeds to S490, in S490, the cut-off switch 70 is turned OFF (the control switch SW2 is turned OFF, specifically).

Next, in S500, a failure determination (state determination) of the cut-off switch 70 is performed based on the potential Vch detected when the drive voltage Vj is at a high level and the cut-off switch 70 is OFF (cut-off state).

If a negative determination is made in S500, the process proceeds to S510. In S510, it is determined that the cut-off switch 70 is abnormal (short-circuit abnormality state).

In S510, the cut-off switch 70 (the control switch SW2) is maintained OFF and the drive voltage Vj is set at a low level.

As a result, the electrical connection between the battery 50 and the power-supply terminal portion 44 can be cut off appropriately, and a current can be inhibited from flowing in a case where the power tool body 10 is connected to the third battery pack 240 when the third battery pack 240 is abnormal. That is, even when the cut-off switch 70 (the switching elements Q2 and Q3) is abnormal, it is possible to inhibit a current from flowing when the third battery pack 240 is abnormal.

Next, in S520, the information that the third battery pack 240 is in a state in which charge and discharge thereof are prohibited (prohibited state) is stored in the flash ROM 60d in the control circuit 60. In this way, it becomes possible to inform the power tool body 10 or the charger 80 that the third battery pack 240 is in a "prohibited state" when the power tool body 10 or the charger 80 is connected to the third battery pack 240.

Next, in S530, a process of storing information that a state of the third battery pack 240 is the "permanent failure level 1" in the flash ROM 60d in the control circuit 60 is performed.

If an affirmative determination is made in S500, the process proceeds to S540. In S540, it is determined that the cut-off switches 70 and 72 are both normal.

In addition, in S540, the cut-off switch 70 (the control switch SW2) is turned ON and the drive voltage Vj is set at a low level.

When any of the processes in S430, S480, S530, and S540 is complete, the cut-off unit state determination process ends.

[Effects of Third Embodiment]

As described above, the third battery pack 240 of the present third embodiment includes the second state determination circuit 276, and is configured to determine states (normal or abnormal) of the cut-off switches 70 and 72 based on the potential Vch.

When the third battery pack 240 is not connected to the power tool body 10 or the charger 80, the control circuit 60 sets the drive voltage Vj at a high level and takes in the potential Vch, to thereby perform a failure determination (state determination) of the cut-off switches 70 and 72 based on the potential Vch.

Thus, according to the third battery pack 240, the failure determination (state determination) of the cut-off switches 70 and 72 can be performed based on the potential Vch at the time when the drive voltage Vj is set at a high level.

In the third battery pack 240, the control circuit 60 performs the permanent failure setting process when a current flowing through the negative power-supply line L2B is detected under the conditions in which the "permanent failure level 1" is stored in the flash ROM 60d.

In the permanent failure setting process, the cut-off switch 70 (the control switch SW2) is turned OFF and the process of melt-cutting the fuse portion 72a in each of the protection circuits F1-F3 in the cut-off switch 72 is performed (S310). This makes it possible to turn at least one of the cut-off switches 70 and 72 to an unenergizable state.

In other words, the situation in which the "permanent failure level 1" is stored in the flash ROM 60d is a situation in which at least one of the cut-off switches 70 and 72 is determined to be abnormal, and the reason why a current flowing through the negative power-supply line L2B is detected in such a situation is considered to be that some abnormality occurs in the third battery pack 240 and the battery 50 is discharging.

Thus, the control circuit 60 performs the permanent failure setting process (i.e., turns at least one of the cut-off switches 70 and 72 to an unenergizable state to inhibit a charge current and a discharge current from flowing) to thereby forcibly stop a current from flowing through the negative power-supply line L2B and stop abnormal discharge of the battery 50. In this way, a critical accident (such as overdischarge) is inhibited from occurring in the third battery pack 240.

Consequently, according to the third battery pack 240, it is possible to stop abnormal discharge of the battery 50, and to inhibit an accident due to such abnormal discharge of the battery 50 from occurring.

The second state determination circuit 276 corresponds to an example of a second state determination circuit of the present disclosure, the voltage output terminal 60e corresponds to an example of a voltage output terminal of the present disclosure, the drive voltage Vj corresponds to an example of a drive voltage of the present disclosure, the resistor R13 corresponds to an example of a determination resistor unit of the present disclosure, the diode D5 corresponds to an example of a determination diode of the present disclosure, and the switching element Q9 corresponds to an example of a switching unit of the present disclosure.

The AFE 52, the discharge current detection circuit 54, and the control circuit 60 performing the permanent failure setting process correspond to an example of a permanent failure determination unit of the present disclosure.

[Other Embodiments]

Though the embodiments of the present disclosure have been described hereinbefore, the present disclosure is not limited to the above-described embodiments and can be carried out in various manners in a scope not departing from the spirit of the present disclosure.

For example, in each of the above-described embodiments, the cut-off switch 70 serving as the first current cut-off unit is configured to include the two switching elements Q2 and Q3. However, the first current cut-off unit may be configured to include a single switching element, or may have a configuration in which three or more switching elements are connected in parallel to each other.

The cut-off switch 72 serving as the second current cut-off unit is configured to include the three protection circuits F1-F3. However, the second current cut-off unit may be configured to include a single protection circuit, or may have a configuration in which two or four or more protection circuits are connected in parallel to each other.

The standby time and the determination reference value Vth1 in the cut-off unit state determination process are not limited to the above-specified values, and appropriate values may be set according to specifications, usages, and the like of the battery pack, the power tool body, and the charger.

Figure 11A:
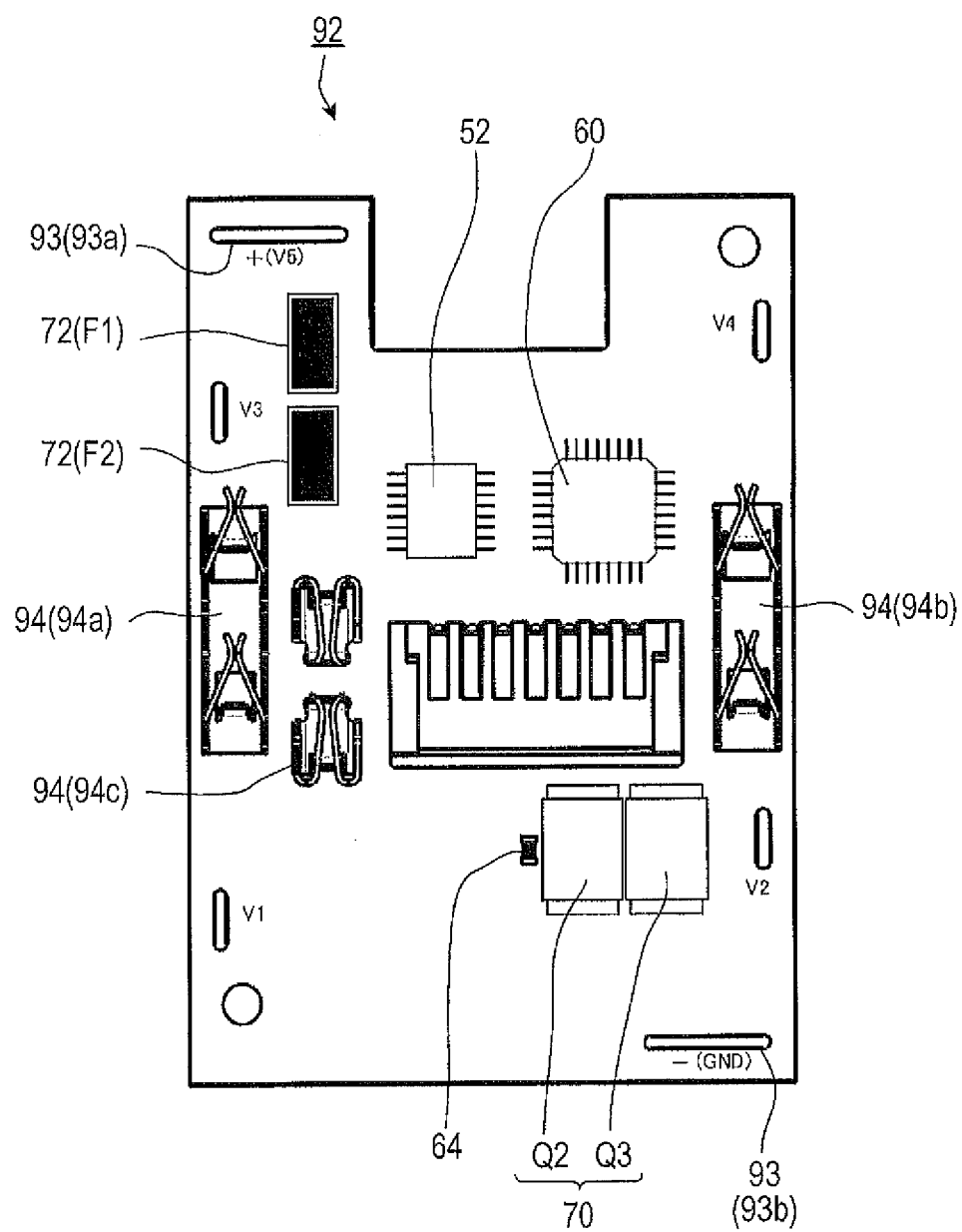
FIG. 11A is an explanatory diagram showing an appearance of a front side of a substrate provided to the battery pack.
Figure 11B:
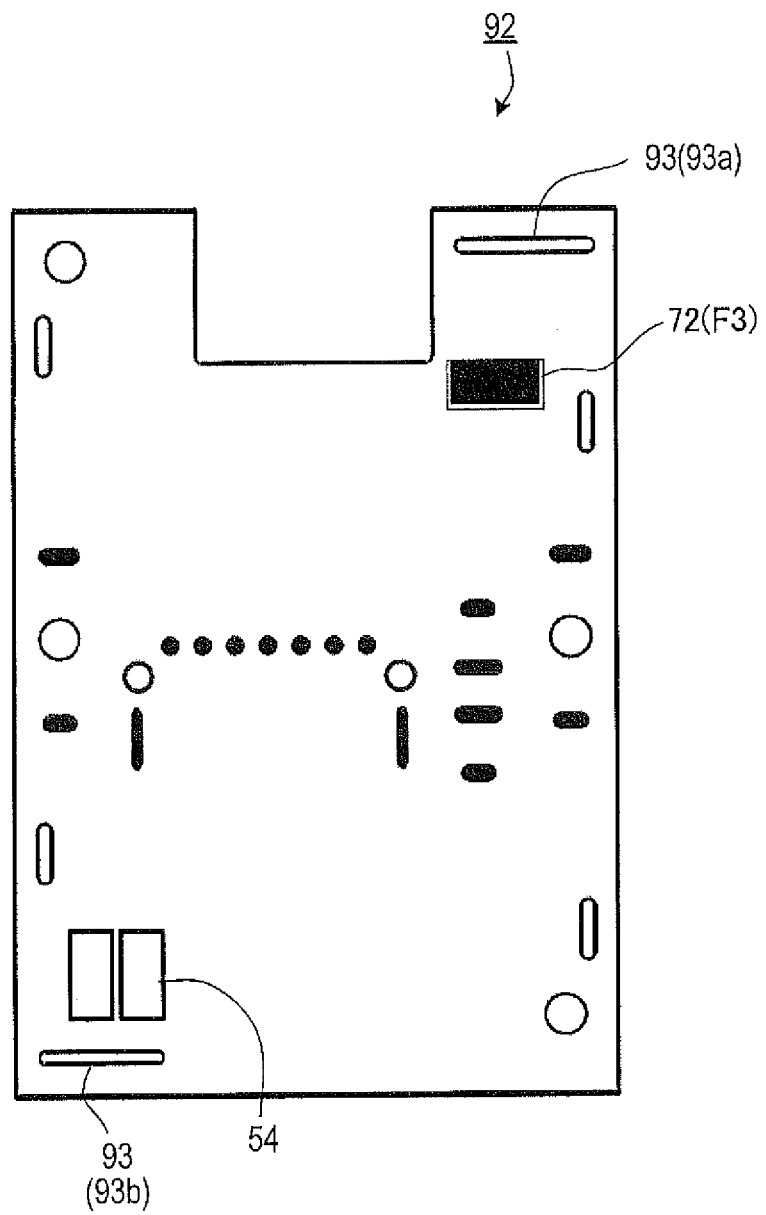
FIG. 11B is an explanatory diagram showing an appearance of a back side of the substrate provided to the battery pack.

The battery pack may be configured to include the battery and a substrate 92 on which the AFE 52, the control circuit 60 (control unit), the cut-off switch 70 (first current cut-off unit), the cut-off switch 72 (second current cut-off unit), and the like are mounted. In this case, as shown in FIGS. 11A and 11B, the substrate 92 includes, as a battery terminal 93, a receiving terminal 93a connected to the positive terminal 50A of the battery 50, and a ground terminal 93b connected to the negative terminal 50B of the battery 50. The receiving terminal 93a and the ground terminal 93b may be arranged spaced apart from each other in a peripheral area of the substrate 92. This enables the control circuit 60, the AFE 52, and the like to be arranged in a central area of the substrate 92.

The substrate 92 further includes an external connection terminal 94 (a positive connection terminal 94a and a negative connection terminal 94b) connected to the power-supply terminal portion 44 (the positive terminal 44A and the negative terminal 44B) serving as an external terminal, and the external connection terminal 94 (a charging terminal 94c) connected to the connection terminal 46D of the connection terminal portion 46 serving as an external terminal. The external connection terminal 94 (the positive connection terminal 94a, the negative connection terminal 94b, and the charging terminal 94c) may be arranged in the central area between the receiving terminal 93a and the ground terminal 93b on the substrate 92. This makes it possible to effectively position connection paths each extending from the receiving terminal 93a and the ground terminal 93b arranged in the peripheral area of the substrate 92 to the external connection terminal 94.

The protection circuits F1-F3 in the cut-off switch 72 (second current cut-off unit) may be arranged in an area between the receiving terminal 93a and the positive connection terminal 94a on the substrate 92, or in an area between the receiving terminal 93a and the charging terminal 94c. This makes it possible to connect the receiving terminal 93a and the positive connection terminal 94a (or the charging terminal 94c) to each other at the shortest distance, to thereby shorten a path through which a large current flows in the power supply path. Similarly, the switching elements Q2 and Q3 in the cut-off switch 70 (first current cut-off unit) may be arranged in an area between the ground terminal 93b and the negative connection terminal 94b on the substrate 92. This makes it possible to connect the ground terminal 93b and the negative connection terminal 94b to each other at the shortest distance, to thereby shorten a path through which a large current flows in the power supply path.

As for a position in which the cut-off switch 72 (second current cut-off unit) is mounted, all elements (the protection circuits F1-F3) in the cut-off switch 72 (second current cut-off unit) may be mounted on a front-side surface of the substrate 92 on which the positive connection terminal 94a is mounted. Alternatively, as shown in FIGS. 11A and 11B, some of the elements (the protection circuit F3) in the cut-off switch 72 (second current cut-off unit) may be mounted on a rear-side surface opposite the front-side surface on which the positive connection terminal 94a is mounted. Similarly, as for a position in which the cut-off switch 70 (first current cut-off unit) is mounted, the entirety of the cut-off switch 70 (first current cut-off unit) may be mounted on the front-side surface of the substrate 92 on which the negative connection terminal 94b is mounted as shown in FIGS. 11A and 11B, or part of the cut-off switch 70 (first current cut-off unit) may be mounted on the rear-side surface opposite the front-side surface on which the negative connection terminal 94b is mounted.

In the case where all elements of the second current cut-off unit (or the first current cut-off unit) are mounted on the same surface of the substrate, the number of man-hour can be reduced in the process of mounting the second current cut-off unit (or the first current cut-off unit) on the substrate. On the other hand, in the case where some of the elements of the second current cut-off unit (or the first current cut-off unit) are mounted on the front-side surface of the substrate and the other elements are mounted on the rear-side surface of the substrate, greater number of components can be mounted on the substrate because the mounting area on the substrate can be efficiently utilized by devising an arrangement of the respective elements.

In each of the above-described embodiments, a configuration is adopted in which the cut-off switch 70 (first current cut-off unit) is provided in the path extending from the negative electrode of the battery to the external terminal and the cut-off switch 72 (second current cut-off unit) is provided in the path extending from the positive electrode of the battery to the external terminal. However, the cut-off switches 70 and 72 (first and second current cut-off units) may be configured to be connected in series to each other in the path extending from the positive electrode of the battery to the external terminal. Alternatively, the cut-off switches 70 and 72 (first and second current cut-off units) may be configured to be connected in series to each other in the path extending from the negative electrode of the battery to the external terminal.

The third battery pack 240 of the third embodiment may be configured such that a process of erasing (deleting) the "permanent failure level 1" stored in the flash ROM 60d is performed in S540, for example.

In the thus-configured third battery pack 240, for example, even when the cut-off switch 70 is erroneously determined to be abnormal (short-circuit abnormality state) for some reasons (such as noise) and the "permanent failure level 1" is stored in the flash ROM 60d, when the cut-off unit state determination process is performed again later and the cut-off switch 70 is determined to be normal, the stored "permanent failure level 1" can thereby be erased (deleted).

That is, even when an erroneous determination affected by noise or the like (erroneous determination that the cut-off switch 70 is abnormal (short-circuit abnormality state)) has occurred, a correct determination can be made by the cut-off unit state determination process being performed again. According to the thus-configured third battery pack 240, it is possible to inhibit the determination accuracy in the state determination of the cut-off switch from being reduced.

What is claimed is:

1. A battery pack comprising:
    a battery comprising at least one rechargeable battery;
    a control unit configured to monitor a state of the battery and to control at least one of charge and discharge of the battery;
    a pair of external terminals configured for an electrical connection of an external device;
    a first current cut-off unit provided in a power supply path that is formed by connecting the battery and the pair of external terminals and through which flows at least one of a charge current and a discharge current, the first current cut-off unit being configured to be turned to one of an energized state and a cut-off state based on a command from the control unit, to thereby turn the power supply path to one of an energized state and a cut-off state; and
    a second current cut-off unit that is connected in series to the first current cut-off unit in the power supply path and is configured to be turned to one of an energized state and a cut-off state based on a command from the control unit, to thereby turn the power supply path to one of an energized state and a cut-off state,
    wherein the control unit is configured to determine whether the first current cut-off unit and the second current cut-off unit are normal or abnormal when neither charge nor discharge of the battery is performed, and configured to turn the first current cut-off unit and the second current cut-off unit to an energized state when the first current cut-off unit and the second current cut-off unit are both normal, whereas configured to turn at least one of the first current cut-off unit and the second current cut-off unit to a cut-off state when the at least one of the first current cut-off unit and the second current cut-off unit is abnormal.

2. The battery pack according to claim 1,
wherein the control unit is configured to determine whether at least one of the first current cut-off unit and the second current cut-off unit is normal or abnormal after the battery pack is disconnected from the external device.

3. The battery pack according to claim 1,
wherein the pair of external terminals comprises a first external terminal and a second external terminal,
wherein the battery comprises a positive electrode and a negative electrode,
wherein the first current cut-off unit is provided in a path extending from the negative electrode of the battery to the first external terminal in the power supply path,
wherein the second current cut-off unit is provided in a path extending from the positive electrode of the battery to the second external terminal in the power supply path, and
wherein the control unit is configured to turn the first current cut-off unit to a cut-off state and to turn the second current cut-off unit to an energized state when determining whether the first current cut-off unit is normal or abnormal, and is configured to determine whether the first current cut-off unit is normal or abnormal based on a potential in a first power supply path extending from the first current cut-off unit to the first external terminal.

4. The battery pack according to claim 3, comprising a state determination circuit arranged so as to connect the first power supply path extending from the first current cut-off unit to the first external terminal and a second power supply path extending from the second current cut-off unit to the second external terminal to each other,
wherein the state determination circuit comprises a diode that allows a current to flow in a direction of discharge of the battery, a resistive element connected in series to an anode of the diode, and a zener diode, a cathode and an anode of which are respectively connected to the anode of the diode and to a ground potential, which is a potential in the negative electrode of the battery, and
wherein the control unit is configured to determine whether at least one of the first current cut-off unit and the second current cut-off unit is normal or abnormal based on a potential at an interconnection point between the zener diode and the diode in the state determination circuit.

5. The battery pack according to claim 3, comprising a second state determination circuit arranged so as to be connected to the first power supply path extending from the first current cut-off unit to the first external terminal, to the second power supply path extending from the second current cut-off unit to the second external terminal, and to a voltage output terminal that outputs a specified drive voltage,
wherein the second state determination circuit comprises a determination resistor unit comprising a pair of terminals, a determination diode comprising an anode and a cathode, and a switching unit comprising a pair of terminals,
wherein a first terminal in the pair of terminals of the determination resistor unit is connected to the voltage output terminal,
wherein a second terminal in the pair of terminals of the determination resistor unit is connected to the anode of the determination diode,
wherein a first terminal in the pair of terminals of the switching unit is connected to the cathode of the determination diode,
wherein a second terminal in the pair of terminals of the switching unit is connected to the first power supply path,
wherein the switching unit is configured to electrically connect the cathode of the determination diode and the first power supply path to each other when a potential difference is generated between the first power supply path and the second power supply path, and is configured to electrically cut off the cathode of the determination diode and the first power supply path from each other when substantially no potential difference is generated between the first power supply path and the second power supply path, and
wherein the control unit is configured to determine whether at least one of the first current cut-off unit and the second current cut-off unit is normal or abnormal based on a potential at an interconnection point between the second terminal of the determination resistor unit and the anode of the determination diode in the second state determination circuit.

6. The battery pack according to claim 1,
wherein the first current cut-off unit comprises a switching element that is connected in series to the power supply path and is capable of being selectively turned ON and OFF,
wherein the second current cut-off unit comprises at least one protection circuit comprising a fuse connected in series to the power supply path and a heating element that melt-cuts the fuse, and
wherein the control unit is configured to energize the heating element in the second current cut-off unit to melt-cut the fuse when the first current cut-off unit is determined to be abnormal, to thereby cut off the power supply path.

7. The battery pack according to claim 6,
wherein the control unit is configured to determine whether the second current cut-off unit is normal or abnormal based on a potential in the heating element in the second current cut-off unit.

8. The battery pack according to claim 6,
wherein the at least one protection circuit comprises a plurality of protection circuits connected in parallel to each other,
wherein each of the plurality of protection circuits comprises an energization control unit that is connected to the heating element and allows a current for melt-cutting the fuse to flow through the heating element, and
wherein the control unit is configured to determine whether the second current cut-off unit is normal or abnormal based on a potential in the heating element in one of the plurality of protection circuits.

9. The battery pack according to claim 3,
wherein the first current cut-off unit comprises a switching element that is connected in series to the power supply path and is capable of being selectively turned ON and OFF,
wherein the second current cut-off unit comprises a switching element that is connected in series to the power supply path and is capable of being selectively turned ON and OFF,
wherein the control unit is configured to turn the first current cut-off unit and the second current cut-off unit both to a cut-off state when determining whether the second current cut-off unit is normal or abnormal, and is configured to determine whether the second current cut-off unit is normal or abnormal based on a potential in the second power supply path extending from the second current cut-off unit to the second external terminal.

10. The battery pack according to claim 1, comprising a storage unit that stores information that the battery pack is in a prohibited state, in which at least one of charge and discharge is prohibited, when at least one of the first current cut-off unit and the second current cut-off unit is determined to be abnormal.

11. The battery pack according to claim 10, further comprising a permanent failure determination unit configured to turn at least one of the first current cut-off unit and the second current cut-off unit to an unenergizable state in a case where an energization in the power supply path is detected when the information that the battery pack is in the prohibited state is stored in the storage unit.

12. The battery pack according to claim 1,
wherein a part of the power supply path is configured to allow the charge current and the discharge current both to flow therethrough, and
wherein the second current cut-off unit is provided in the part of the power supply path.

* * * * *